United States Patent
Schrammel

(10) Patent No.: US 11,650,802 B2
(45) Date of Patent: May 16, 2023

(54) IDIOMATIC SOURCE CODE GENERATION

(71) Applicant: Diffblue Ltd, Oxford (GB)

(72) Inventor: Peter Schrammel, Oxford (GB)

(73) Assignee: DIFFBLUE LTD, Oxford (GB)

(*) Notice: Subject to any disclaimer, the term of this patent is extended or adjusted under 35 U.S.C. 154(b) by 196 days.

(21) Appl. No.: 17/130,249

(22) Filed: Dec. 22, 2020

(65) Prior Publication Data
US 2022/0197617 A1    Jun. 23, 2022

(51) Int. Cl.
*G06F 8/51* (2018.01)
*G06F 8/30* (2018.01)

(52) U.S. Cl.
CPC . *G06F 8/51* (2013.01); *G06F 8/30* (2013.01)

(58) Field of Classification Search
CPC ..................................... G06F 8/51; G06F 8/30
See application file for complete search history.

(56) References Cited

U.S. PATENT DOCUMENTS

| 2017/0161177 | A1* | 6/2017 | Bird | G06F 11/3672 |
| 2019/0377561 | A1* | 12/2019 | Yang | G06F 8/51 |
| 2020/0341736 | A1* | 10/2020 | Brown | G06F 11/0706 |
| 2022/0179651 | A1* | 6/2022 | Qiu | G06F 8/75 |
| 2022/0222169 | A1* | 7/2022 | Raszka | G06F 11/0772 |

FOREIGN PATENT DOCUMENTS

WO    WO-2020145892 A1 *   7/2020   ............... G06F 8/30

* cited by examiner

*Primary Examiner* — Wei Y Zhen
*Assistant Examiner* — Amir Soltanzadeh
(74) *Attorney, Agent, or Firm* — Dority & Manning, P.A.

(57) ABSTRACT

A computer-implemented method comprising obtaining a first part or representation of a code section as a code part, said code part comprising a first code characteristic, analyzing the code part to identify context information related to the code section, obtaining a first idiomatic modifier based on the first code characteristic and the context information, wherein the first idiomatic modifier in use transforms a first code statement of the code part such that the transformed first code statement corresponds to an idiomatic representation of the first code statement, and generating a modified code part by applying the first idiomatic modifier to the code part.

17 Claims, 20 Drawing Sheets

```
public void testUE123() {
    String local_c_00 = "Philip";
    String local_c_01 = "WRIGHT";
    User local_d = new User(local_c_00, local_c_01);
    assertTrue("Incorrect forename", local_d.getForename().equals("Philip"));
}
```

Figure 2A

```
User local_0 = new User("John", "SMITH");
Account local_1 = new CurrentAccount(local_1);
long local_2 = 50L;
local_1.addToBalance(local_2);
assertTrue("Balance doesn't balance", local_1.getBalance() == local_2);
```

Figure 5A

```
User user = new User("John", "SMITH");

Account objectUnderTest = new CurrentAccount(user);

long expectedValue = 50L;

objectUnderTest.addToBalance(expectedValue);

assertTrue("Balance doesn't balance", objectUnderTest.getBalance() == expectedValue);
```

Figure 5B

```
LogicBoard local_0 = new LogicBoard();
boolean local_1 = true;
boolean local_2 = true;
boolean local_3 = local_0.XOR( local_1 , local_2 );
assertTrue("XOR is incorrect", local_3 == false);
```

Figure 6A

```
LogicBoard local_0 = new LogicBoard();
                    604
    boolean local_2 = true;
                  622-1   622-2      620
    boolean local_3 = local_0.XOR( true , local_2 );

assertTrue("XOR is incorrect", local_3 == false );
```

Figure 6B

```
LogicBoard local_0 = new LogicBoard();

boolean local_3 = local_0.XOR( true , true );

assertTrue("XOR is incorrect", local_3 == false );
```

Figure 6C

```
import static java.lang.Math.exp;    720

...                                  714
a = exp(1.8);

b = com.diffblue.math.exp(1.8);      716 assertTrue("Exponential incorrect", a==b);    718
```

Figure 7B

IDIOMATIC SOURCE CODE GENERATION

FIELD OF INVENTION

Aspects of the present disclosure relate to the automatic generation of idiomatic source code. In particular, aspects of the present disclosure relate to the transformation of a part or representation of an automatically generated piece of source code to an idiomatic source code representation thereof.

BACKGROUND

For many software development tasks, automatic source code generation tools can lead to a reduction in development time and associated development cost. This is particularly the case for automated tools for software test generation, where unit tests for a codebase can be automatically obtained.

Existing tools for automated software generation produce code which is considered unidiomatic. That is, the code produced is easily identifiable as being produced as a result of executing an automated software generation tool. The code produced will often use random variable and method names, have non-standard formatting, and include a number of redundant code statements.

In contrast, idiomatic code has the appearance of human authorship. Idiomatic code has one or more characteristics which indicate that the code could have been written by a human software developer. Such idiomatic characteristics may include correct formatting and indentation, purposive method and variable naming, and the inlining of code statements. Idiomatic code often makes more efficient use of storage and memory requirements by avoiding redundant statements, whilst also being easier for a human software developer to understand.

As such, the unidiomatic source code produced by existing tools for automated software generation can be inefficient and difficult to understand. Furthermore, the incorporation of unidiomatic, automatically generated tests into an existing codebase of tests can make it difficult for a software engineer to ascertain the purpose of the test, and whether or not the codebase of tests includes the necessary tests. This can lead to increased development time and less efficient use of human and system resources.

Accordingly, there is a need for automated tools for idiomatic source code generation which can produce source code having the appearance of human authorship.

SUMMARY OF INVENTION

The present disclosure is directed to systems and methods for idiomatic source code generation which aims to address some of the above identified problems.

According to an aspect of the present disclosure, there is provided a computer-implemented method comprising obtaining a first part or representation of a code section as a code part, said code part comprising a first code characteristic, analyzing the code part to identify context information related to the code section, obtaining a first idiomatic modifier based on the first code characteristic and the context information, wherein the first idiomatic modifier in use transforms a first code statement of the code part such that the transformed first code statement corresponds to an idiomatic representation of the first code statement, and generating a modified code part by applying the first idiomatic modifier to the code part.

According to a further aspect of the present disclosure, there is provided a system comprising: one or more processors and one or more non-transitory computer-readable media that collectively store instructions that, when executed by the one or more processors, cause the system to perform operations, the operations comprising: obtaining a first part or representation of a code section as a code part, said code part comprising a first code characteristic, analyzing the code part to identify context information related to the code section, obtaining a first idiomatic modifier based on the first code characteristic and the context information, wherein the first idiomatic modifier in use transforms a first code statement of the code part such that the transformed first code statement corresponds to an idiomatic representation of the first code statement, and generating a modified code part by applying the first idiomatic rule to the code part.

According to an additional aspect of the present disclosure, there is provided a non-transitory computer readable medium comprising one or more instructions which when executed by one or more processors cause a device to carry out operations comprising: obtaining a first part or representation of a code section as a code part, said code part comprising a first code characteristic, analyzing the code part to identify context information related to the code section, obtaining a first idiomatic modifier based on the first code characteristic and the context information, wherein the first idiomatic modifier in use transforms a first code statement of the code part such that the transformed first code statement corresponds to an idiomatic representation of the first code statement, and generating a modified code part by applying the first idiomatic rule to the code part.

Beneficially, the systems and methods of the present disclosure allow idiomatic source code to be generated from a part, or representation, of an unidiomatic code section whilst maintaining the functionality of the code. This improves the usability of the source code generated as the idiomatic source code is easier to read and understand, whilst, in some embodiments, also being a more compact and efficient representation of the unidiomatic code.

Furthermore, the systems and methods of the present disclosure allow for complex idiomatic modifiers to be constructed by combining a plurality of simple idiomatic modifiers. By using the output of one modification process as the input to a subsequent modification process (using either the same idiomatic modifier or a different idiomatic modifier) allows complex idiomatic source code to be automatically generated using a chain of simple modifiers. The idiomatic source code generated using the systems and method of the present disclosure can thus be generated in a resource efficient way. For example, this can improve efficiency by reducing the processing and memory resources needed to repeatedly refine automatically generated test code.

In some example implementations, the first idiomatic modifier transforms the first code statement by modifying a portion of the first code statement to create a modified portion of the first code statement.

Optionally, in some example implementations, the transformed first code statement comprises the modified portion of the first code statement.

Optionally, in some example implementations, the first idiomatic modifier in use transforms a second code statement of the code part such that the transformed first code statement corresponds to an idiomatic representation of the first code statement and the second code statement.

Optionally, in some example implementations, the code part further comprises a second characteristic.

Optionally, in some example implementations, the computer-implemented method further comprises obtaining a second idiomatic modifier based on the second characteristic and the context information, wherein the second idiomatic modifier in use transforms a second code statement of the code part such that the transformed second code statement corresponds to an idiomatic representation of the second code statement.

Optionally, in some example implementations, the operations further comprise obtaining a second idiomatic modifier based on the second characteristic and the context information, wherein the second idiomatic modifier in use transforms a second code statement of the code part such that the transformed second code statement corresponds to an idiomatic representation of the second code statement.

Optionally, in some example implementations, generating the modified code part further comprises applying the second idiomatic modifier to the code part.

Optionally, in some example implementations, the second code statement is the first code statement.

Optionally, in some example implementations, the first code characteristic corresponds to a non-functional issue associated with one or more code statements included in the code part.

Optionally, in some example implementations, the context information relates to one or more non-functional features of the code part.

Optionally, in some example implementations, the one or more non-functional features of the code part include one or more chosen from the group including: class names, field names, method names, variable names, construction and formatting of literals, construction and formatting of container types, framework and version-specific assertions, framework and version-specific class annotations, framework and version-specific method annotations, omission of casts where possible, omission of type parameters where possible, inlining of statements and call chaining where appropriate, factoring out of common code where appropriate, imports, static imports where appropriate, placement of comments, visual code structuring where appropriate, code formatting such indentations and line breaking.

BRIEF DESCRIPTION OF DRAWINGS

Embodiments of the invention will now be described, by way of example only, and with reference to the accompanying drawings, in which:

FIG. 2A shows a source code listing comprising unidiomatic code;

FIG. 5A shows an unidiomatic code part to which a variable naming modifier is to be applied according to an embodiment;

FIG. 5B shows a modified code part generated from the unidiomatic code part shown in FIG. 5A according to an embodiment;

FIG. 6A shows an unidiomatic code part to which an inlining modifier is to be applied according to an embodiment;

FIG. 6B shows a modified code part generated from the unidiomatic code part shown in FIG. 6A according to an embodiment;

FIG. 6C shows a modified code part generated from the modified code part shown in FIG. 6B according to an embodiment;

FIG. 7B shows a modified code part generated from the code part shown in FIG. 7A according to an embodiment;

DETAILED DESCRIPTION

Figure 1:
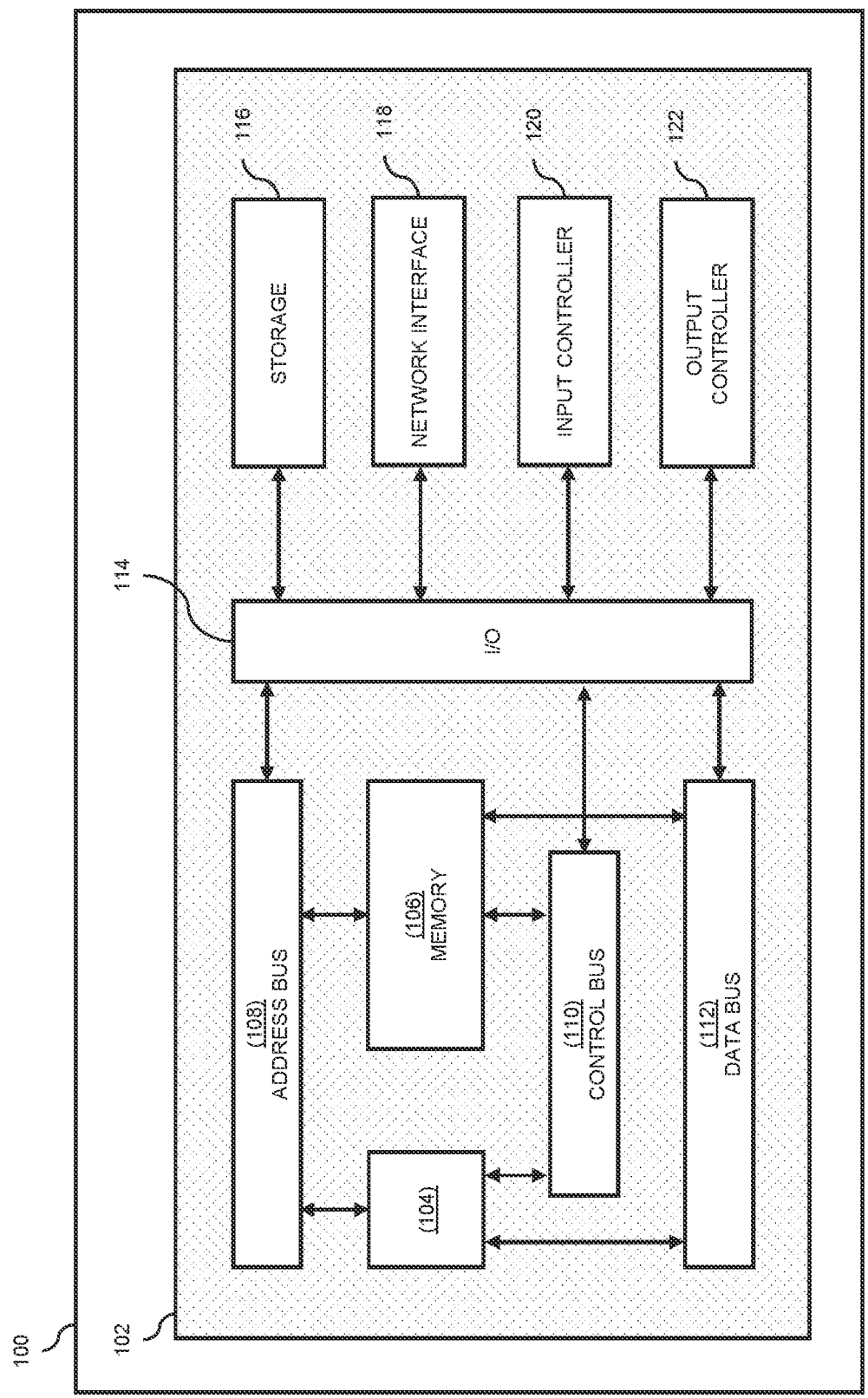
FIG. 1 shows an example computing system for idiomatic source code generation according to an embodiment.

Embodiments of the present disclosure will be now described with reference to the attached figures. It is to be noted that the following description is merely used for enabling the skilled person to understand the present disclosure, without any intention to limit the applicability of the present disclosure to other embodiments which could be readily understood and/or envisaged by the reader. In particular, whilst the present disclosure is primarily directed to the transformation of automatically generated tests to an idiomatic representation, the skilled person will appreciate that the present disclosure is applicable to situations whereby idiomatic source code is to be generated, e.g., from an existing source code listing.

In the present disclosure, references to items in the singular should be understood to include items in the plural, and vice versa, unless explicitly stated otherwise or clear from the context. Grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth. The use of any and all examples, or exemplary language ("e.g.," "such as," "including," or the like) provided herein, is intended merely to better illuminate the embodiments and does not pose a limitation on the scope of the embodiments or the claims.

For consistency and ease of reference, the present disclosure is described primarily in relation to the Java programming language. However, the skilled person will appreciate that the systems and methods of the present disclosure are not limited as such. Indeed, the systems and methods of the present disclosure are applicable to any suitable programming language or environment, including but not limited to Java, C, C++, any suitable assembly language, Python, C#, JavaScript, Ruby, PHP, and the like.

Some embodiments described herein may relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to, magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a transitory computer program product, which can include, for example, the instructions and/or computer code discussed herein.

Some embodiments and/or methods described herein can be performed by software (executed on hardware), hardware, or a combination thereof. Hardware modules include, for example, a general-purpose processor, a field programmable gate array (FPGA), and/or an application specific integrated circuit (ASIC). Software modules (executed on hardware) can be expressed in a variety of software languages (e.g., computer code), including C, C++, Java, Ruby, Visual Basic, Python, and/or other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. For example, embodiments can be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

A computing environment for idiomatic source code generation where the devices, systems, and methods discussed herein may be utilized will now be described.

FIG. 1 shows an example computing system for idiomatic source code generation. Specifically, FIG. 1 shows a block diagram of an embodiment of a computing system according to example embodiments of the present disclosure.

Computing system 100 can be configured to perform any of the operations disclosed herein such as, for example, any of the operations discussed with reference to the functional units described in relation to FIG. 3. Computing system includes one or more computing device(s) 102. Computing device(s) 102 of computing system 100 can comprise one or more processors 104 and memory 106. One or more processors 104 can be any general purpose processor(s) configured to execute a set of instructions. For example, one or more processors 104 can be one or more general-purpose processors, one or more field programmable gate array (FPGA), and/or one or more application specific integrated circuits (ASIC). In one embodiment, one or more processors 104 include one processor. Alternatively, one or more processors 104 include a plurality of processors that are operatively connected. One or more processors 104 can be communicatively coupled to memory 106 via address bus 108, control bus 110, and data bus 112. Memory 106 can be a random access memory (RAM), a read-only memory (ROM), a persistent storage device such as a hard drive, an erasable programmable read-only memory (EPROM), and/or the like. Computing device(s) 102 can further comprise I/O interface 114 communicatively coupled to address bus 108, control bus 110, and data bus 112.

Memory 106 can store information that can be accessed by one or more processors 104. For instance, memory 106 (e.g., one or more non-transitory computer-readable storage mediums, memory devices) can include computer-readable instructions (not shown) that can be executed by one or more processors 104. The computer-readable instructions can be software written in any suitable programming language or can be implemented in hardware. Additionally, or alternatively, the computer-readable instructions can be executed in logically and/or virtually separate threads on one or more processors 104. For example, memory 106 can store instructions (not shown) that when executed by one or more processors 104 cause one or more processors 104 to perform operations such as any of the operations and functions for which computing system 100 is configured, as described herein. In addition, or alternatively, memory 106 can store data (not shown) that can be obtained, received, accessed, written, manipulated, created, and/or stored. The data can include, for instance, the data and/or information described herein in relation to FIGS. 3 to 12. In some implementations, computing device(s) 102 can obtain from and/or store data in one or more memory device(s) that are remote from the computing system 100.

Computing system 100 further comprises storage unit 116, network interface 118, input controller 120, and output controller 122. Storage unit 116, network interface 118, input controller 120, and output controller 122 are communicatively coupled to central control unit or computing devices 102 via I/O interface 114.

Storage unit 116 can be a computer readable medium, a non-transitory computer readable medium, comprising one or more programs, the one or more programs comprising instructions which when executed by one or more processors 104 cause computing system/environment 100 to perform the method steps of the present disclosure. Alternatively, storage unit 116 can be a transitory computer readable medium. Storage unit 116 can be a persistent storage device such as a hard drive, a cloud storage device, or any other appropriate storage device.

Network interface 118 can be a Wi-Fi module, a network interface card, a Bluetooth module, and/or any other suitable wired or wireless communication device. In an example embodiment, network interface 118 is configured to connect to a network such as a local area network (LAN), or a wide area network (WAN), the Internet, or an intranet.

FIG. 1 illustrates one example computer system 100 that can be used to implement the present disclosure. Other computing systems can be used as well. Computing tasks discussed herein as being performed at and/or by one or more functional unit(s) (e.g., as described in relation to FIG. 3) can instead be performed remote from the respective system, or vice versa. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implemented tasks and/or operations can be performed sequentially or in parallel. Data and instructions can be stored in a single memory device or across multiple memory devices.

The present disclosure relates to the automatic generation of an idiomatic representation of a code section or representation thereof. The idiomatic representation has the same functionality as the original code section or representation, but is automatically transformed so as to appear as though the code was written by a human software developer. The idiomatic representation can be seamlessly integrated into existing codebases without reducing the intelligibility of the codebase. In particular, the present disclosure relates to the automatic generation of an idiomatic code representation of an automatically generated test. This can improve efficiency of generating an effective test that will produce a useable result and can help reduce the processing and memory resources needed to repeatedly refine automatically generated test code.

FIG. 2A shows a source code listing comprising unidiomatic source code.

FIG. 2A shows code section 200 which corresponds to an automatically generated unit test. FIG. 2A shows method name 202 and first block 204 of code section 200. First block 204 can comprise a code statement involving first variable name 206, a code statement involving second variable name 208, and/or a code statement involving third variable name 210. The code statement involving third variable name 210 can be associated with instantiation of an object of a class having a constructor including first parameter value 212-1 and second parameter value 212-2. FIG. 2A further shows first indentation 214, second indentation 216, third indentation 218, and fourth indentation 220 each of which can be associated with a code statement of code section 200.

Whilst code section 200 is shown in the Java programming language, the skilled person will appreciate that the present disclosure is not limited solely to the Java programming language, nor is it limited solely to a particular programming paradigm such as object-oriented programming. Indeed, the present disclosure is applicable to any suitable compiled or interpretive programming or scripting language including but not limited to Java, C, C++, any suitable assembly language, Python, C#, JavaScript, Ruby, PHP, and the like. Furthermore, the present disclosure is not limited to the transformation of a high-level language. As will be described in more detail below, the systems and methods of the present disclosure are applicable to any suitable representation or intermediate language.

Code section 200 can correspond to an unidiomatic source code section. In particular, code section 200 can comprise a number of issues which identify that the source code may have been automatically generated, and is thus unidiomatic. For example, method name 202 has no relevance to the purpose of the associated method, and is not descriptive in the way that a method name written by a human software developer would be. The same is true for first variable name 206, second variable name 208, and third variable name 210. In addition, the code statements within first block 204 are split across multiple lines, whereas a human software developer would most likely place the constant values "Philip" and "WRIGHT" inline within the constructor. Moreover, the lack of consistency between first indentation 214, second indentation 216, third indentation 218, and fourth indentation 220 does not follow the practice of a normal, skilled, software developer.

Figure 2B:
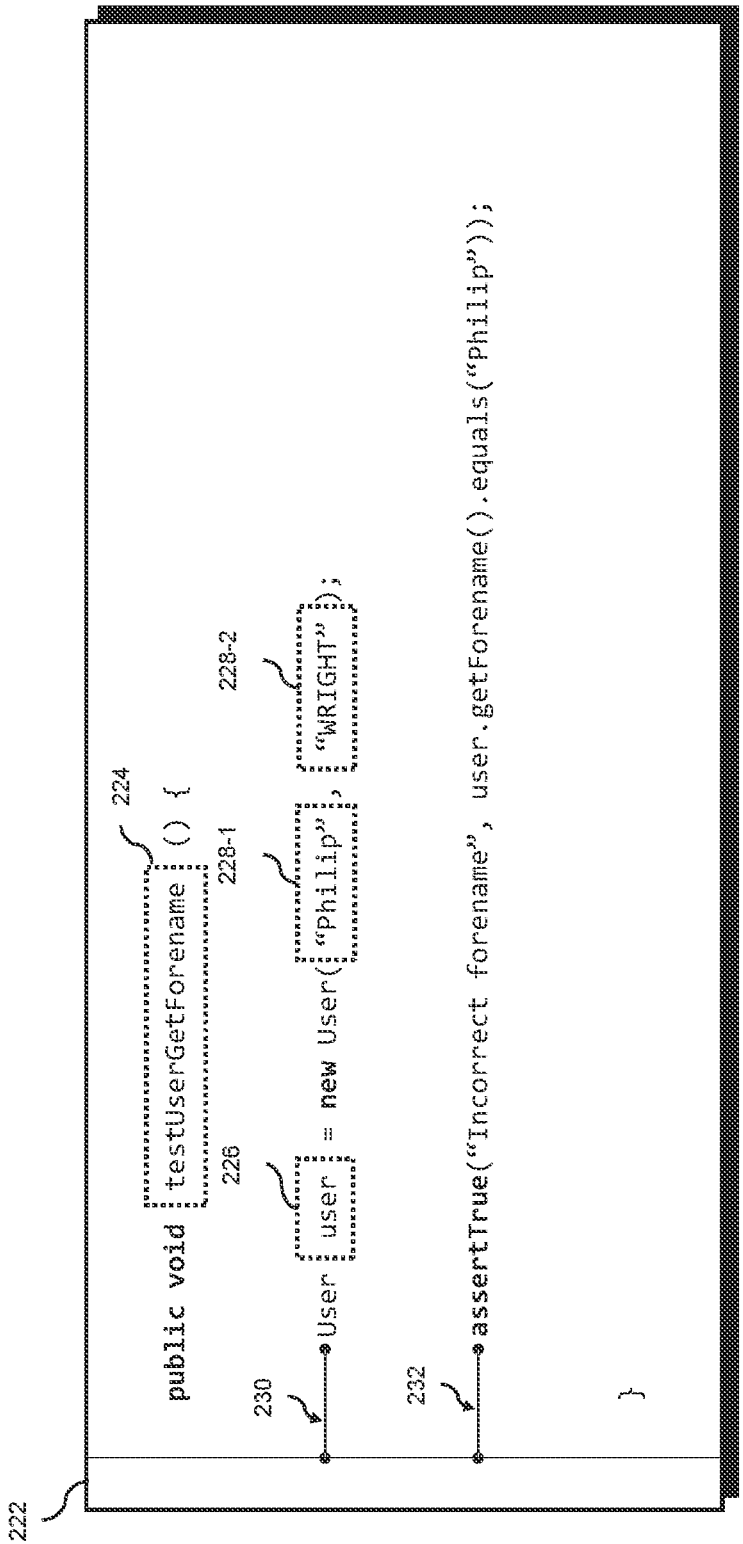
FIG. 2B shows an idiomatic representation of the code section shown in FIG. 2A.

FIG. 2B shows an idiomatic representation of code section 200 shown in FIG. 2A.

FIG. 2B shows idiomatic code section 222 which corresponds to an idiomatic representation of code section 200 shown in FIG. 2A. Idiomatic code section 222 can comprise idiomatic method name 224 and first idiomatic variable name 226. First idiomatic variable name 226 can be associated with instantiation of an object for a class having a constructor including first parameter value 228-1 and second parameter value 228-2. FIG. 2B further shows first adjusted indentation 230 and second adjusted indentation 232, which can be equal and thus more readily match the indentation practices of a human software developer.

The values assigned to the variables associated with first variable name 206 and second variable name 208 within code section 200 of FIG. 2A have been inlined as first parameter value 228-1 and second parameter value 228-2 within idiomatic code section 222. This results in more idiomatic code since most human software developers will inline code wherever possible in order to avoid the creation of unnecessary variables. First idiomatic variable name 226 can correspond to an idiomatic representation of third variable name 210 shown in FIG. 2A. First idiomatic variable name 226 can be considered idiomatic as the name more readily matches the variable name that a human software developer would use (e.g., the name captures the purpose and/or context of the variable).

The systems and methods of the present disclosure generate idiomatic source code, such as that shown in FIG. 2B, from unidiomatic representations, such as the source code shown in FIG. 2A. The resulting idiomatic source code more readily matches the source code produced by a human software developer.

Figure 3:
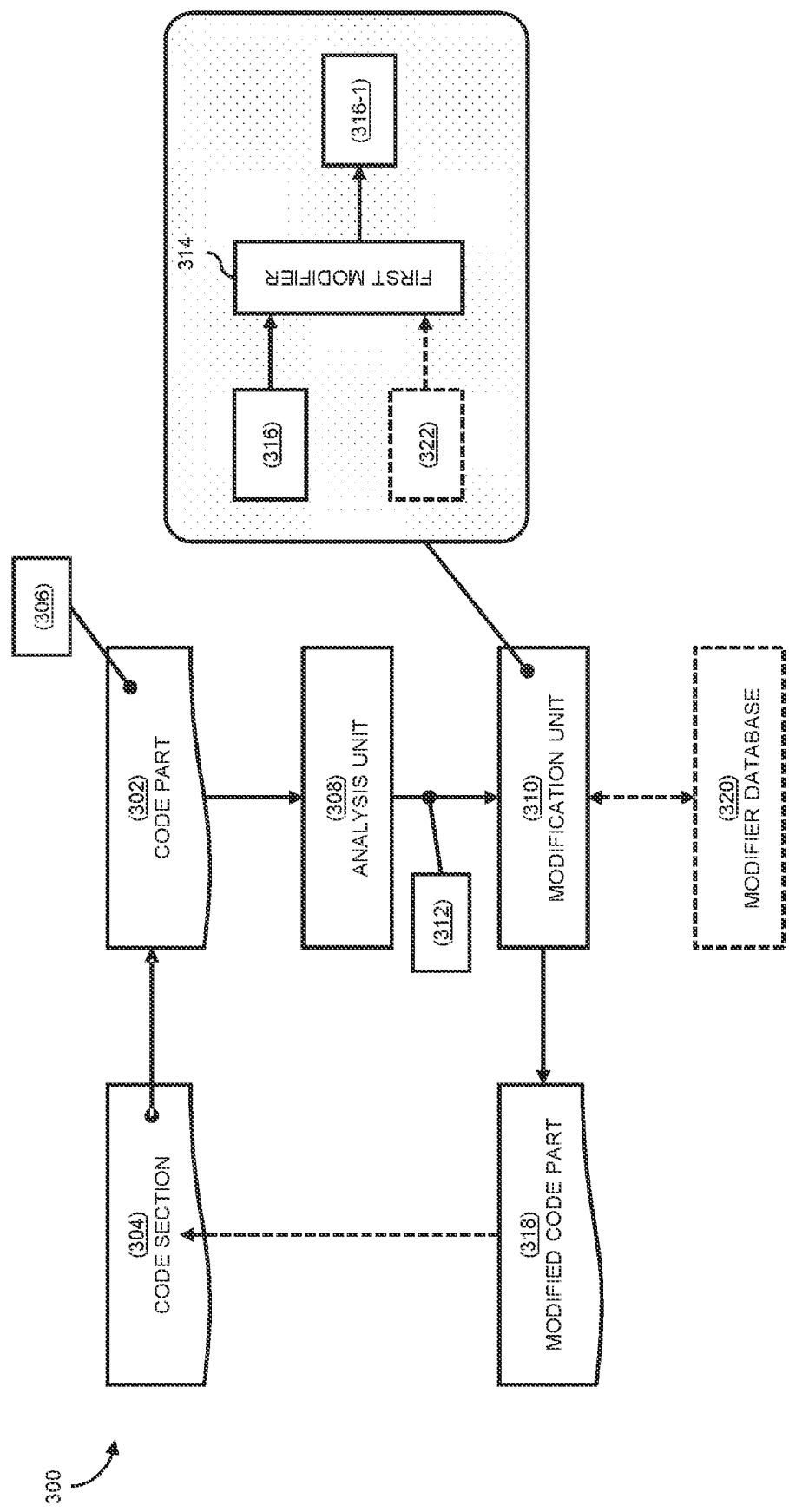
FIG. 3 shows a system for idiomatic source code generation according to an aspect of the present disclosure.

FIG. 3 shows system 300 for idiomatic source code generation according to one embodiment.

FIG. 3 shows code part 302 which is obtained from a first part or representation of code section 304. Code part 302 can comprise first code characteristic 306. System 300 can comprise analysis unit 308 and modification unit 310. Analysis unit 308 can analyze code part 302 to identify context information 312 related to code part 302. Modification unit 310 can obtain first idiomatic modifier 314 based on first code characteristic 306 and context information 312. First idiomatic modifier 314 can be configured to transform a code statement, such as first code statement 316 of code part 302, to create a transformed code statement, such as transformed first code statement 316-1. Transformed first code statement 316-1 can correspond to an idiomatic representation of first code statement 316. Modification unit 310 can generate modified code part 318 by applying first idiomatic modifier 314 to code part 302.

System 300 is an efficient and extendible framework for transforming unidiomatic code, of a representation thereof, into idiomatic source code. System 300 can work directly on high-level source code or an intermediate or abstract code representation. As such, system 300 is able to transform automatically generated source code, particularly automatically generated tests, into an idiomatic representation which has the appearance of human authorship. The use of system 300 therefore greatly improves the usability and functionality of automatic test generation systems by allowing the transformed idiomatic source code to be seamlessly integrated into existing codebases. This helps improve the efficiency of automatic source code generation tasks by automatically generating source code which resembles existing, human authored code.

Whilst example aspects of the present disclosure is directed to the transformation of unidiomatic code (or a representation thereof) corresponding to an automatically generated test, the skilled person will appreciate that the systems and methods of the present disclosure are not limited as such.

Figure 7A:
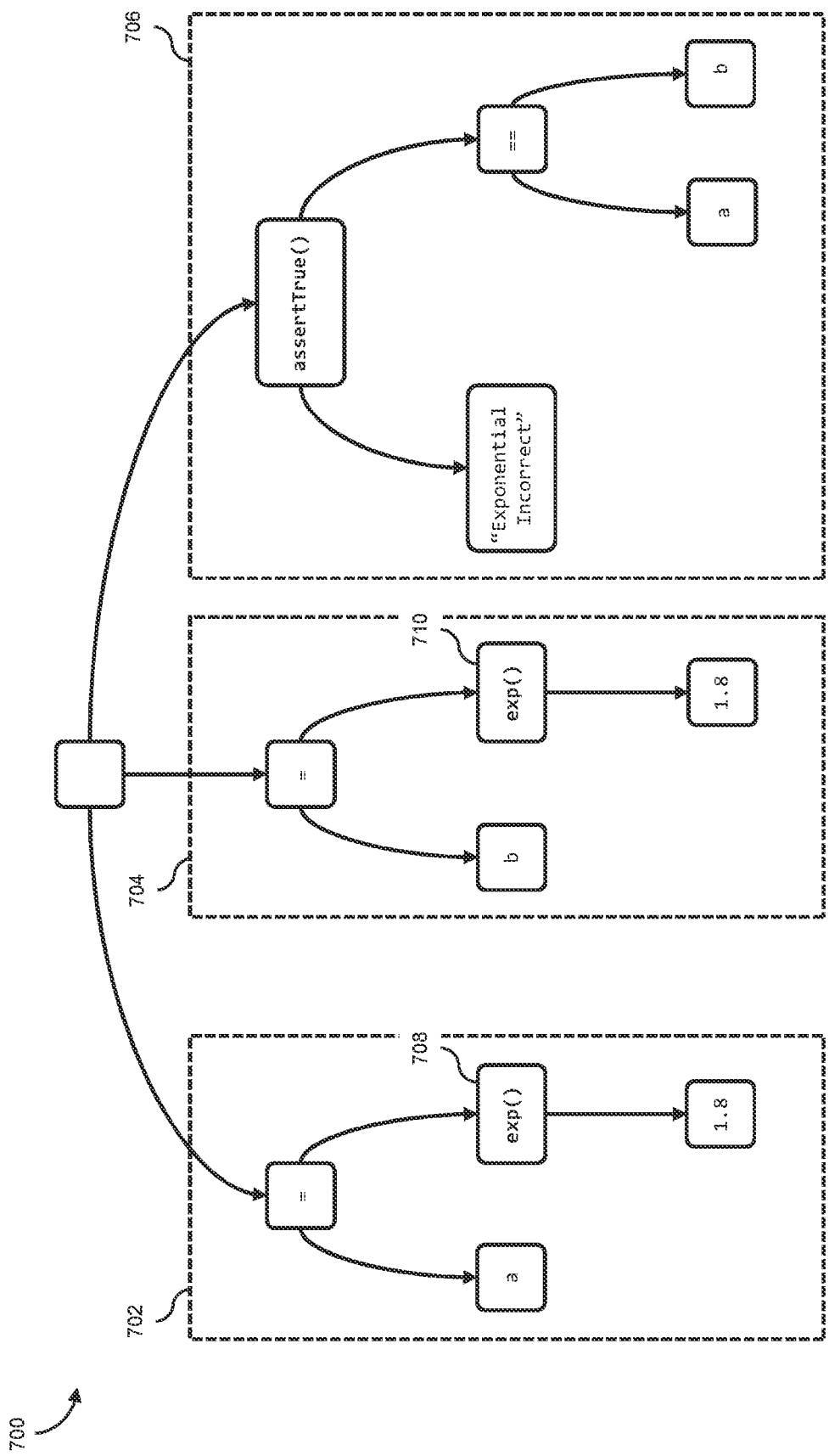
FIG. 7A shows a code part to which an import resolution modifier is to be applied according to an embodiment.

Code part 302 can correspond to a first part or representation of a code section. In one embodiment, the first part or representation of the code section can be obtained from an existing codebase. That is, the first part or representation of the code section can comprise one or more code statements within an existing codebase. As such, the first part or representation of the code section in the present embodiment can correspond to high-level unidiomatic source code. In an alternative embodiment, the first part or representation of the code section can comprise an intermediate representation of a code section. For example, an abstract syntax tree (as shown in FIG. 7A and described in more detail below) can be used to represent the code section for which an idiomatic representation (e.g., idiomatic high-level source code) is to be generated.

As such, whilst examples aspects of the present disclosure is described in relation to the first part or representation of the code section being provided in a high-level representation (e.g., the Java programming language), the skilled person will appreciate that this is done for ease of understanding and consistency. The present disclosure is not limited to generating an idiomatic representation of Java code only. The systems and methods of the present disclosure are equally applicable to generating idiomatic code from an intermediate representation, even if the intermediate representation and the generated idiomatic code are different programming languages or representations. For example, the systems and methods of the present disclosure can be used to generate idiomatic Java code from an intermediate representation of a code part represented e.g., as a syntax tree.

In one embodiment, the code section can be manually obtained. A software developer can manually identify a code section for which an idiomatic representation is to be generated. The identified code section can then be input to the systems and methods of the present disclosure as a code part. As such, the systems and methods of the present disclosure can be integrated as a tool into existing software development environments, thus allowing software developers to generate idiomatic representations of code sections within existing codebases.

In an alternative embodiment, the code section can be automatically obtained. An existing codebase, or a representation of a codebase or a part thereof, can be segmented into a possible plurality of code sections, where each code section comprises one or more code statements. The existing codebase can comprise manually or automatically generated code. Alternatively, a possible plurality of code sections can be identified from the output of an automatic source code generation tool. The automatically identified code section can then be input to the systems and methods of the present disclosure as a code part.

A code part can correspond to a contiguous and functionally related block of code comprising one or more code statements. For example, a code part can correspond to a method or a function. Alternatively, a code section can correspond to a single code statement.

The obtained code part can either manually or automatically identified as comprising a first code characteristic. In system 300 shown in FIG. 3, code part 302 is identified as comprising first code characteristic 306. As will be described in more detail below, in one embodiment, code part 302 can comprise a second code characteristic. A code part can comprise a plurality of code characteristics.

A code characteristic, such as first code characteristic 306, can correspond to a non-functional issue associated with one or more code statements included in a code part, such as code part 302. The non-functional issue acts as an identifier of an unidiomatic aspect or feature of the code part. For example, the non-functional issue can relate to inconsistent indentations used across multiple code statements of the code part. Consequently, whilst code part 302 can comprise first code characteristic 306, modified code part 318 may not comprise first code characteristic 306 because modified code part 318 is an idiomatic representation of code part 302 specifically generated to address the idiomatic issue associated with first code characteristic 306.

First code characteristic 306 can correspond to one of a plurality of predefined code characteristics. Each code characteristic can correspond to a non-functional issue and can be associated with an idiomatic modifier which is configured to address the non-functional issue. In one embodiment, the first code characteristic can be manually selected from the plurality of predefined code characteristics. In an alternative embodiment, when the code part corresponds to high-level source code, the first code characteristic can be automatically selected from the plurality of predefined code characteristics based on an analysis of the code part. For example, predefine features associated with each characteristic can be used to identify the presence of certain characteristics within a code part.

In embodiments where the code part corresponds to an intermediate representation (e.g., a syntax tree or the like), then the first code characteristic can be considered present by default. For example, if the code part is represented in an intermediate or abstract representation, then no line indentations may be present in the intermediate or abstract representation. Therefore, a first characteristic associated with the lack of consistent line indentations may be considered present by default in order to ensure that the idiomatic code generated comprises consistent line indentations.

As stated previously, a code characteristic, such as first code characteristic 306, can correspond to a non-functional issue and can be associated with an idiomatic modifier which is configured to address the non-functional issue. In order to address the non-functional issue, an idiomatic modifier can employ context information 312 associated with code part 302.

In an embodiment, context information 312 identified by analysis unit 308 can relate to one or more features of code part 302. In some implementations, the one or more features of code part 302 can be non-functional features.

In an embodiment, analysis unit 308 can be configured to identify context information 312 by extracting one or more features from code part 302. The one or more features can be identified by performing a keyword matching between a database of predefined keywords and words appearing within code part 302. For example, keyword matching can be used to identify standard types such as int, boolean, etc., appearing within a code part. In addition, or alternatively, the one or more features can be identified by performing template matching. For example, a code part can be matched against a template corresponding to a specific code structure in order to determine context information indicative of whether the code part conforms to the specific code structure. In further examples multiple templates can be stored in a memory and the code part 302 can be matched to one of the templates. In addition, or alternatively, the one or more features can be identified by performing a pattern based analysis. For example, regular expressions can be used to identify features and patterns within a code part such as indentations, method calls, method parameters, and the like.

The one or more features of code part 302 can include one or more chosen from the group including: class names, field names, method names, variable names, construction and formatting of literals, construction and formatting of container types, framework and version-specific assertions, framework and version-specific class annotations, framework and version-specific method annotations, omission of casts where possible, omission of type parameters where possible, inlining of statements and call chaining where appropriate, factoring out of common code where appropriate, imports, static imports where appropriate, placement of comments, visual code structuring where appropriate, code formatting such as indentations and line breaking, and/or debugging information.

Context information 312 can be stored in a data structure accessible to a modification unit, such as modification unit 310.

Modification unit 310 can be configured to use first code characteristic 306 and context information 312 to obtain first idiomatic modifier 314. As described in further detail below, modification unit 310 can obtain first idiomatic modifier 314 from modifier database 320 according to one embodiment. In use, first idiomatic modifier 314 can generate an idiomatic representation of a code statement within code part 302 such that the idiomatic representation substantially addresses the non-functional issue associated with first code characteristic 306. Specifically, first idiomatic modifier 314 in use can transform first code statement 316 of code part 302 thereby to generate transformed first code statement 316-1. Transformed first code statement 316-1 can correspond to an idiomatic representation of first code statement 316. As such, modification unit 310 can generates modified code part 318 by applying first idiomatic modifier 314 to code part 302.

In an embodiment, a modification unit, such as modification unit 310, can apply more than one idiomatic modifier to the same code part. Optionally, the modification unit can apply the second idiomatic modifier to the transformed code part generated by the first idiomatic modifier. Alternatively, the modification unit can repeat apply the first idiomatic modifier to the transformed code part generated by the first idiomatic modifier.

As will be described in more detail below, an idiomatic modifier, such as first idiomatic modifier 314, can be associated with a code characteristic, or non-functional issue, of a code part. An idiomatic modifier can be operable to use context information associated with the code part to transform a code statement within the code part into an idiomatic representation thereof. For example, an idiomatic modifier associated with a code characteristic indicative of a non-idiomatic method name used within a code part can transform the non-idiomatic method name into an idiomatic representation thereof based on context information identified from the code part.

In an embodiment, first idiomatic modifier 314 can transform first code statement 316 by modifying a portion of first code statement 316 to create transformed first code statement 316-1, where transformed first code statement 316-1 comprises the modified portion of first code statement 316.

In an embodiment, first idiomatic modifier 314 in use can transform second code statement 322 of code part 302 such that the transformed first code statement corresponds to an idiomatic representation of first code statement 316 and second code statement 322. In a further embodiment, an idiomatic modifier can transform a code block within a code part to generate an idiomatic representation of the code block. The idiomatic representation of the code block can comprise a code statement.

In an embodiment, code part 302 can comprise a second code characteristic and modification unit 310 can be configured to obtain a second idiomatic modifier (not shown) associated with the second code characteristic. The second idiomatic modifier can be obtained in the same manner as described above in relation to first idiomatic modifier 314. The second idiomatic modifier in use can transform a second code statement of code part 302 such that the transformed second code statement can correspond to an idiomatic representation of the second code statement. Optionally, the second code statement can be first code statement 316. Alternatively, the second code statement can be modified first code statement 316-1. In this embodiment, modification unit 310 can generate modified code part 318 by applying first idiomatic modifier 314 to code part 302 and applying the second idiomatic modifier to code part 302. Optionally, modified code part 318 can replace code part 302 within code section 304.

As stated previously, an idiomatic modifier can be associated with a specific code characteristic, or non-functional issue, of a code part. In an embodiment, an idiomatic modifier can be one of a method naming modifier, a variable naming modifier, a class naming modifier, an inlining modifier, an import resolution modifier, a formatting modifier, a redundancy modifier, a cast modifier, and/or a generic type modifier. Each of the foregoing modifiers will now be described by way of example and in reference to system 300 of FIG. 3.

Method Naming Modifier

In an embodiment, an idiomatic modifier, such as first idiomatic modifier 314 of FIG. 3, can be a method naming modifier. The method naming modifier can transform the name of a method within a code part into an idiomatic representation thereof. The method naming modifier can be obtained from modifier database 320.

In a first embodiment, the method naming modifier can transform the name of a method by identifying the purpose of the method from the context information. That is, the transformed method name can describe what the method is testing. A method name transformed according to this approach can correspond to an idiomatic name because purposive method naming follows naming conventions used by human software developers. As an example of the present embodiment, a test which asserts whether a call to method getValue( ) is successful could be transformed to the idiomatic representation testGetValue( ).

As such, the method naming modifier of the present embodiment can transform a first code statement—e.g., the method declaration or signature—of the code section such that the transformed first code statement corresponds to an idiomatic representation of the method declaration or signature. The idiomatic representation can describe the purpose of the test. The idiomatic representation can be prefixed with a predefined word or phrase, such as "test", to indicate that the method is related to a test.

In order to determine the purpose of the test, context information related to the code part (e.g., the test method) can be used to determine a behavior-based representation of the code part. The method naming modifier can use the behavior-based representation to transform the unidiomatic method declaration or signature into an idiomatic representation thereof.

The behavior-based representation of the code part can be determined by identifying a plurality of parts or sections within the code part according to a predetermined structure. For example, the Given-When-Then structure, the Arrange-Act-Assert structure, or the Four-Phase Test structure. Accordingly, a modification unit, such as modification unit 310 of FIG. 3, can be configured to determine a behavior-based representation of a code part, such as code part 302, using context information, such as context information 312. A method naming modifier can utilize the determined behavior-based representation to transform the unidiomatic method name to an idiomatic representation thereof.

Figure 4A:
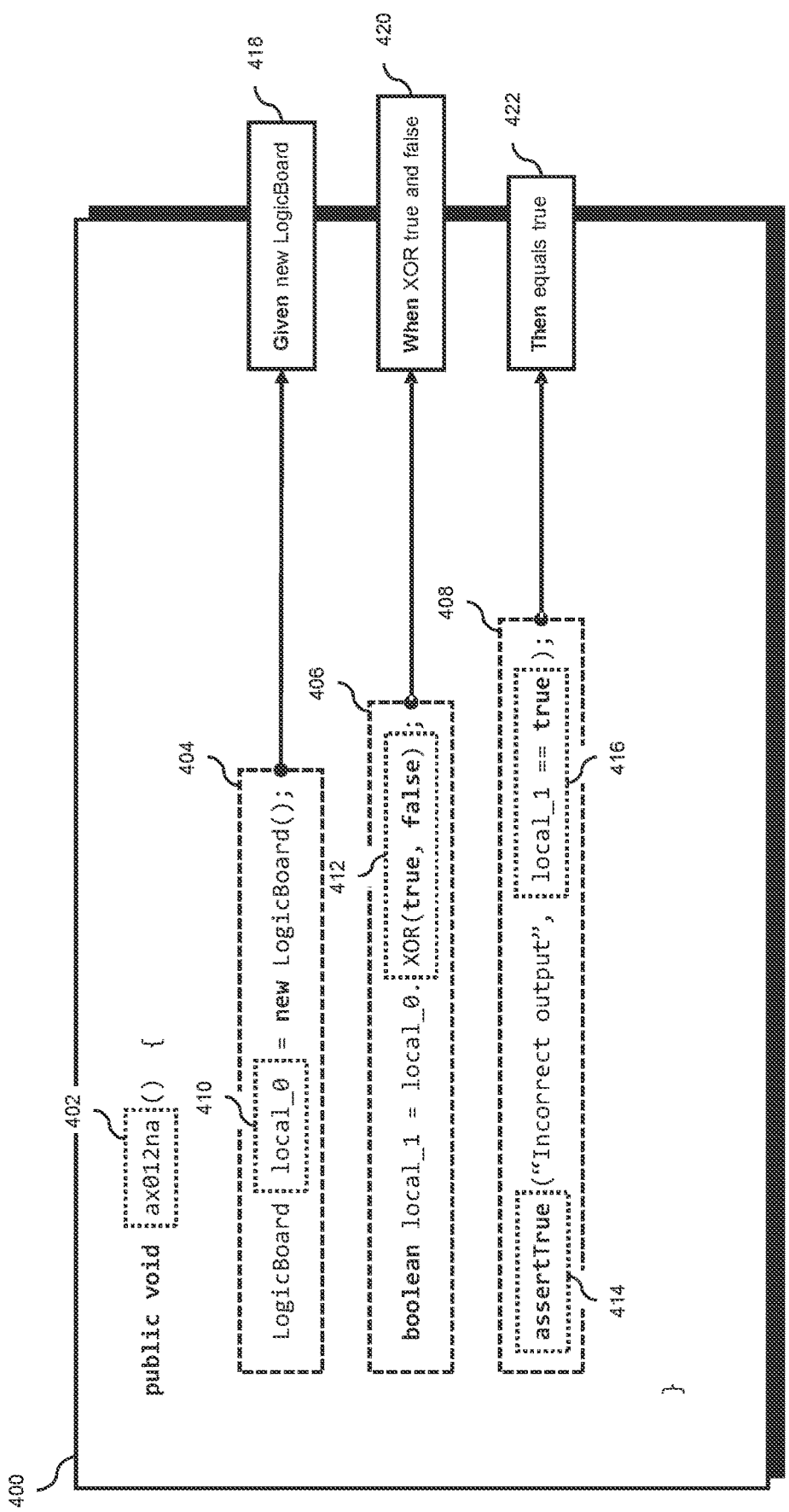
FIG. 4A shows an unidiomatic code part to which a method naming modifier is to be applied according to an embodiment.

FIG. 4A shows an unidiomatic code part to which a method naming modifier is to be applied.

FIG. 4A shows code part 400 comprising a program code statement including method name 402 for which an idiomatic representation is to be generated. As such, a code characteristic associated with code part 400 can comprise the unidiomatic nature of method name 402. Code part 400 can comprise first code section 404, second code section 406, and third code section 408. First code section 404 can comprise constructor call 410 which instantiates a new LogicBoard object. Second code section 406 can comprise a variable assignment involving method call 412 which corresponds to a call to the XOR( ) method of the object created in first code section 404. Third code section 408 can comprise assertion 414 which asserts conditional statement 416.

Constructor call 410, method call 412, assertion 414, and conditional statement 416 can correspond to context information used to identify the Given-When-Then structure and the idiomatic representation of method name 402. The context information shown in this instance can represent a subset of the context information of code part 400 extracted by an analysis unit, such as analysis unit 308 of FIG. 3. The sections of the Given-When-Then structure can be automatically identified in a number of ways. For example, assertion 414 can indicate that third code section 408 is associated with the "then" section of the test. Conditional statement 416 within third code section 408 can relate to a variable assigned within second code section 406 thus indicating that third code statement is associated with the "when" section of the test. First code section 404 can thus be associated with the "given" section of the test. As an alternative example, if the code part is represented in an intermediate or abstract representation (e.g., syntax tree) then the sections of the Given-When-Then structure can be identified from the different branches or sub-trees within a tree based representation. The skilled person will appreciate that numerous methods exist to identify a behavior-based representation or structure of a code part.

In the present embodiment, the modification unit can use the identified code sections and the context information to identify first statement 418, second statement 420, and third statement 422. First statement 418 can be identified from first code section 404, associated with the "given" section, based on constructor call 410. Second statement 420 can be identified from second code section 406, associated with the "when" section", based on method call 412. Third statement 422 can be identified from third code section 408 based on assertion 414 and conditional statement 416.

The method naming idiomatic modifier can use first statement 418, second statement 420, and third statement 422 to generate an idiomatic method name for code part 400. In one embodiment, the idiomatic method name can be generated by concatenating first statement 418, second statement 420, and third statement 422.

For example, the idiomatic method name generated in this manner would be "test_new_LogicBoard_XOR_True_And_False_Equals_True". Optionally, the "Given", "When", and "Then" terms can be added to the idiomatic method name.

Optionally, redundant words within the idiomatic method name can be removed in order to provide a more compact and readable method name. In this embodiment, a heuristic can be applied to identify the relevant words to include in the idiomatic method name.

A method may have a number of associated tests, particularly within the context of automatic test generation where multiple tests for a single method can be quickly and easily identified. Code part 400 can correspond to a test associated with method call 412 (e.g., it is a test of the XOR( ) method of the LogicBoard class). In this instance, the method of method call 412 can correspond to the method under test. As such, there may be multiple tests associated with the method under test where each test changes the setup of the method call or the assertion made after the method call.

Figure 4B:
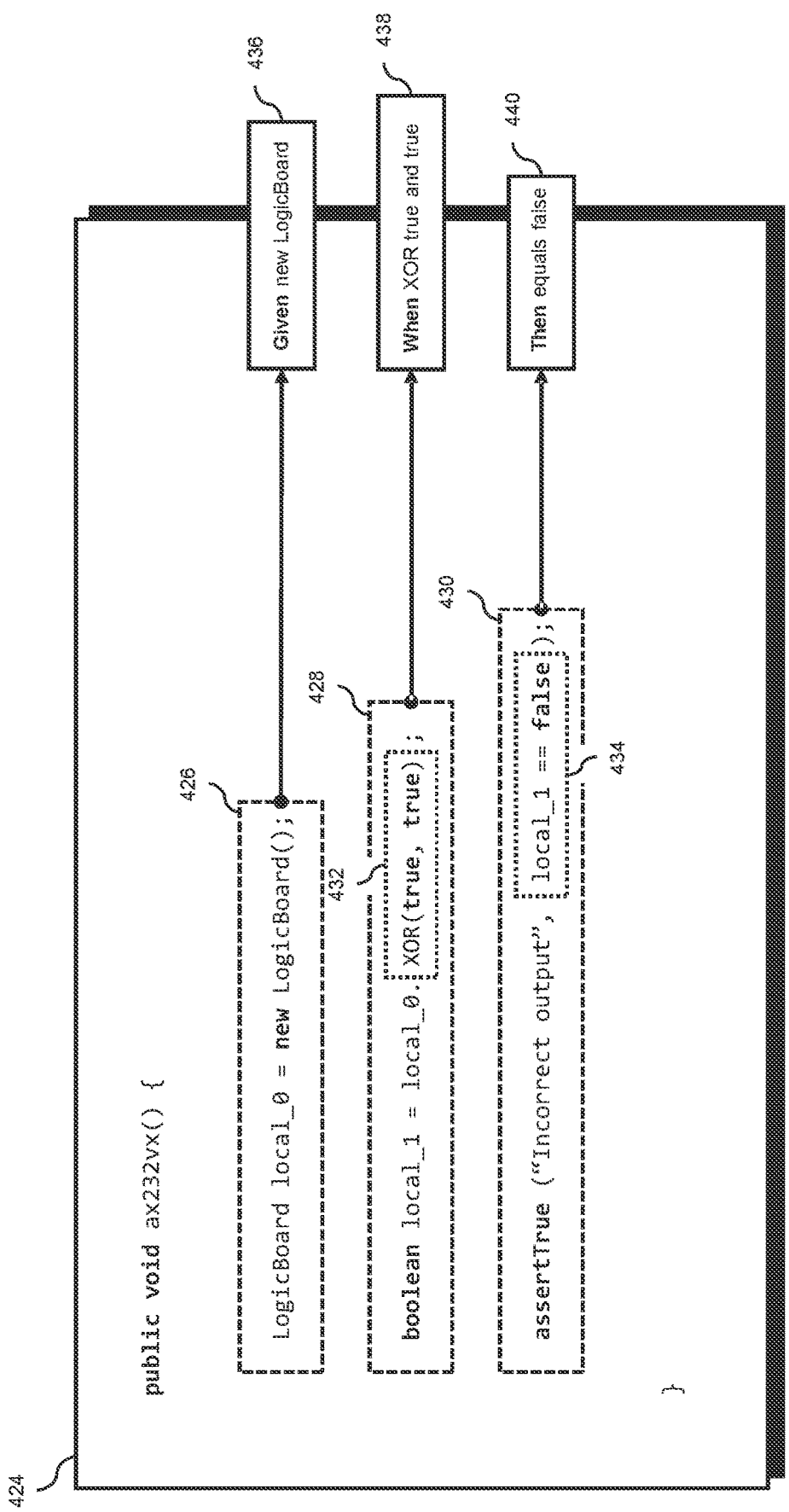
FIG. 4B shows a further test associated with the method under test of FIG. 4A.

FIG. 4B shows a further test of the method under test shown in code part 400 of FIG. 4A.

FIG. 4B shows code part 424, fourth code section 426, fifth code section 428, and sixth code section 430. Fourth code section 426 can be the same as first code section 404 of FIG. 4A. Fifth code section 428 of FIG. 4B can comprise method call 432 which is different to method call 412 in second code section 406 of FIG. 4A. Sixth code section 430 can comprise conditional statement 434 which is different to conditional statement 416 in third code section 408 of FIG. 4B. Fourth statement 436 can be identified from fourth code section 426, fifth statement 438 can be identified from fifth code section 428, and sixth statement 440 can be identified from sixth code section 430.

Therefore, whilst the method under test can be the same for the tests shown in FIGS. 4A and 4B, the values passed to the method and the assertion made after calling the method are different. The differences are reflected in the difference between fifth statement 438 of FIG. 4B and second statement 420 of FIG. 4A, and the difference between sixth statement 440 of FIG. 4B and third statement 422 of FIG. 4A. These differences are indicative of the purpose of the test and are thus useful in identifying the idiomatic method name.

Accordingly, a heuristic used by the method naming modifier to identify a compact idiomatic method name can first identify all other code parts, or tests, associated with the method under test of the code part (e.g., code part 400 of FIG. 4A and code part 302 of FIG. 3), and then determine the differences between the code part and the identified other code parts. The idiomatic method name can be generated by the method naming modifier on the basis of the identified differences, as the common code can be redundant and has no value when determining an idiomatic name.

In the example shown in FIGS. 4A and 4B, first code section 404 of FIG. 4A and fourth code section 426 of FIG. 4B are the same. Thus, the heuristic used by method naming modifier can determine that first code section 404 of FIG. 4A can be ignored when determining an idiomatic method name. However, second code section 406 and third code section 408 in FIG. 4A are different to their counterpart code sections in FIG. 4B. Thus, the heuristic used by method naming modifier can determine that the idiomatic name is generated based on second code section 406 and third code section 408 of FIG. 4A. In the present embodiment, the idiomatic method name generated for method name 402 by the method naming modifier when using the heuristic approach would be, "test_XOR_True_And_False_Equals_True".

Optionally, the idiomatic method name can be generated in accordance with a predefined naming scheme. Generally, the predefined naming scheme enables the method name to be generated in accordance with consistent stylistic and formatting rules, such as those defined in a coding style guide or code conventions. For example, the existing predefined naming scheme can define whether or not a prefix is used, and if a prefix is used, what form the prefix takes (e.g., "test", "my_test", etc.). As a further example, the existing predefined naming scheme can also define whether underscores, Pascal case, or camel case are used (e.g., "test_method", "TestMethod", or "testMethod").

In a further embodiment, coverage information obtained from the method under test can be utilized to determine further information related to the purpose of the test. For example, coverage information obtained from execution of the method under test can indicate the execution of conditional statements within the method under test. This information can be used to help determine the purpose of the test by identifying any conditional execution paths within the method under test.

Variable Naming Modifier

In an embodiment an idiomatic modifier, such as first idiomatic modifier 314 of FIG. 3, can be a variable naming modifier. The variable naming modifier can transform the name of a variable within a code part into an idiomatic representation thereof. The variable naming modifier can be obtained from modifier database 320.

In a first embodiment, the variable naming modifier can transform the name of a variable by utilizing debugging information contained within the context information. For example, if the codebase from which the code part is obtained has been compiled with debugging information, then the original name of the variable may be contained within the debugging information and stored within the context information. Therefore, if the original name of the variable is present within the context information, then the variable naming modifier in the present embodiment can transform a code statement comprising the unidiomatic variable name into an idiomatic representation by replacing the unidiomatic variable name with the original name of the variable contained within the context information.

In an alternative embodiment, the variable naming modifier can transform the name of a variable according to one or more variable naming rules. A first variable naming rule can determine the transformed variable name based on the type of the variable as indicated within the context information. A second variable naming rule can determine the transformed variable name based on the use made of the variable within the code part. A third variable naming rule can determine the transformed variable name based on the parameter name of the method or function to which it is passed.

FIG. 5A shows unidiomatic code part 500 to which a variable naming modifier is to be applied.

Unidiomatic code part 500 can comprise first unidiomatic variable name 502, second unidiomatic variable name 504, and third unidiomatic variable name 506. As such, a code characteristic associated with unidiomatic code part 500 can comprise the unidiomatic nature of first unidiomatic variable name 502, second unidiomatic variable name 504, and/or third unidiomatic variable name 506. First unidiomatic variable name 502 can be associated with instantiation of first type 508—User. Second unidiomatic variable name 504 can be associated with instantiation of second type 510—CurrentAccount. Third unidiomatic variable name 506 can be associated with third type 512—long.

Unidiomatic code part 500 can further comprise code statement 514 corresponding to a call to method addToBalance( ) of the object associated with second unidiomatic variable name 504. As unidiomatic code part 500 can correspond to a part of a unit test code section, addToBalance( ) is considered the method under test and the object associated with second unidiomatic variable name 504 is considered the object under test. Unidiomatic code part 500 can further comprise conditional statement 516 as part of an assertion.

First type 508, second type 510, third type 512, code statement 514, and conditional statement 516 can correspond to context information used by a variable naming modifier to transform an unidiomatic variable name within unidiomatic code part 500. The context information shown in this instance can represent a subset of the context information of code part 400 extracted by an analysis unit, such as analysis unit 308 of FIG. 3.

In the present embodiment, a modification unit, such as modification unit 310 of FIG. 3, can use the variable naming modifier to transform first unidiomatic variable name 502, second unidiomatic variable name 504, and third unidiomatic variable name 506 into idiomatic representations thereof. Particularly, the variable naming modifier can transform an unidiomatic variable name according to a variable naming rule. The variable naming modifier can be repeatedly applied to unidiomatic code part 500 to transform each of the unidiomatic variable names into idiomatic representations thereof.

FIG. 5B shows modified code part 518 generated from unidiomatic code part 500 of FIG. 5A.

Modified code part 518 can comprise first transformed variable name 520, second transformed variable name 522, and third transformed variable name 524. First transformed variable name 520 can be obtained by applying a variable naming modifier to the code statement comprising first unidiomatic variable name 502 in unidiomatic code part 500. Second transformed variable name 522 can be obtained by applying a variable naming modifier to the code statement comprising second unidiomatic variable name 504 in unidiomatic code part 500. Third transformed variable name 524 can be obtained by applying a variable naming modifier to the code statement comprising third unidiomatic variable name 506 in unidiomatic code part 500.

A modification unit, such as modification unit 310 of FIG. 3, can use a variable naming modifier to transform first unidiomatic variable name 502 into first transformed variable name 520 by applying a first variable naming rule. The first variable naming rule can determine the transformed variable name based on the type of the variable, as indicated within the context information. In the example shown in FIG. 5A, first unidiomatic variable name 502 can be associated with first type 508—User. Therefore, the first variable naming rule can determine first transformed variable name 520 based on first type 508 contained within the context information. Disambiguation between multiple variables of the same type can be achieved by suffixing a sequence number, e.g. "user_1", "user_2", etc.

A modification unit, such as modification unit 310 of FIG. 3, can use a variable naming modifier to transform second unidiomatic variable name 504 into second transformed variable name 522 by applying a second variable naming rule different to the first variable naming rule. The second variable naming rule can determine the transformed variable name based on the use made of the variable within the code part. Specifically, the second variable naming rule can identify a predefined transformed variable name based on a pattern of usage identified from the context information of the code part.

In the example shown in FIG. 5A, second unidiomatic variable name 504 can be used in code statement 514 to invoke an instance method—addToBalance( ) Code statement 514 thus can correspond to the Act section of the unit test represented by unidiomatic code part 500. Therefore, the pattern of usage determined from the context information (e.g., code statement 514) can indicate that second unidiomatic variable name 504 corresponds to the object under test. Consequently, second variable naming rule can identify a predefined transformed variable name—second transformed variable name 522—based on a pattern of usage determined from the code part. In this instance, second variable naming rule can specify that if the variable name is associated with the object under test then the transformed variable name is "objectUnderTest". Beneficially, this naming helps to identify the object under test within the code part.

A modification unit, such as modification unit 310 of FIG. 3, can use a variable naming modifier to transform third unidiomatic variable name 506 into third transformed variable name 524 by applying the second variable naming rule. The transformation of third unidiomatic variable name 506 to third transformed variable name 524 illustrates the use of a further predetermined transformed variable name based on a pattern usage identified from the context information of the code part. In the example shown in FIG. 5A, third unidiomatic variable name 506 can be used in conditional statement 516. Thus, the pattern of usage determined from the context information (e.g., conditional statement 516) can indicate that third unidiomatic variable name 506 corresponds to an expected value. Consequently, second variable naming rule can identify a predefined transformed variable name—third transformed variable name 524—based on a pattern of usage determined from the code part. In this instance, second variable naming rule can specify that if the variable name is associated with a condition statement within an assertion then the transformed variable name is "expectedValue".

A modification unit, such as modification unit 310 of FIG. 3, can perform a universal variable renaming once the transformed variable name has been determined. That is, any subsequent use of the renamed variable can be updated to correspond to the renamed variable. In the example shown in FIG. 5B, first variable reference 520-1, second variable reference 522-1, third variable reference 522-2, fourth variable reference 524-1, and fifth variable reference 524-2 have all been updated in order to correspond to first transformed variable name 520, second transformed variable name 522, and third transformed variable name 524 respectively.

In a further embodiment, other patterns of use can correlate with different predefined names. For example, if the context information indicates that a variable is used as a return value from a method, then the variable name can be transformed to an appropriate predetermined transformed variable name, e.g. "ret urnValue". As a further example, if the context information indicates that a variable is used as an index variable within a loop, then the variable name can be transformed to an appropriate predetermined transformed variable name, e.g. "index", "i", "j", etc.

In an embodiment, a modification unit, such as modification unit 310 of FIG. 3, can use a variable naming modifier to transform an unidiomatic variable name into a transformed variable name by applying a third variable naming rule different to the first variable naming rule and the second variable naming rule. The third variable naming rule can determine the transformed variable name based on the parameter name of the method or function to which it is passed. For example, if a variable associated with an unidiomatic variable name is passed as an argument to a method having a method signature setAge (int age), then the third variable naming rule can use the parameter name, age, as identified within the context information, to set the name of the unidiomatic variable to an idiomatic variable name—e.g., age.

Class Naming Modifier

In an embodiment, an idiomatic modifier, such as first idiomatic modifier 314 of FIG. 3, can be a class naming modifier. The class naming modifier can transform the name of a class within a code part into an idiomatic representation thereof. The class naming modifier can be obtained from modifier database 320.

In one embodiment, the class naming modifier can transform the name of a class by utilizing a predetermined template. As such, a code characteristic associated with a code part for which a class naming modifier is to be applied can comprise the unidiomatic nature of the class name used within the code part. In one example, the predefined template can be of the form "TestClass". In a further example, the predefined template can be chosen to fit within the naming scheme of the present codebase (e.g., "TestClass", "TestMyClass", "MyClassTest", "MyClassTests", etc.). Optionally, "Class" can be replaced with the name of the class or method being tested, as identified from the context information. In this way, generated tests can be inserted into the right test class if such a class exists, and new classes can be created following the same naming scheme if not.

Alternatively, the class naming modifier can transform the name of a class by utilizing a predetermined template in conjunction with context information obtained from the code part. For example, if the context information indicates that the class relates to multiple tests of a single method—e.g., the context information contains multiple references to a method, "addToBalance( )—then the method name contained within the context information can be used by the class naming modifier to transform the unidiomatic class name into an idiomatic representation thereof—e.g., "TestAddToBalance". Similarly, if the context information indicates that the class relates to multiple tests of a single class—e.g., the context information contains multiple references to the class "CurrentAccount"—then the class name contained within the context information can be used by the class naming modifier to transform the unidiomatic class name into an idiomatic representation thereof—e.g., "TestCurrentAccount".

Inlining Modifier

In an embodiment, an idiomatic modifier, such as first idiomatic modifier 314 of FIG. 3, can be an inlining modifier. The inlining modifier can selectively inline certain elements within a code part to group code statements together thereby making the code more compact and improving code readability. The inlining modifier can be obtained from modifier database 320.

The inlining modifier can transform a first code statement of a code part and a second statement of the code part to generate a transformed code statement, where the transformed code statement corresponds to an idiomatic representation of the first code statement and the second code statement. That is, the transformed code statement can comprise an inlined representation of the first code statement and the second code statement. More generally, the inlining modifier can transform a code block of the code part to generate a transformed code statement comprising an inlined representation of the code block. The code block can comprise a plurality of related code statements within the code part.

As described in more detail below, the inlining modifier can generate the transformed code statement based on one or more predefined inlining rules.

FIG. 6A shows unidiomatic code part 600 to which an inlining modifier is to be applied.

Unidiomatic code part 600 can comprise first code statement 602, second code statement 604, third code statement 606, and fourth code statement 608. First code statement 602 can comprise a variable assignment involving first constant value 610. Second code statement 604 can comprise a variable assignment involving second constant value 612. Third code statement 606 can comprise a determination of a value based on a method call taking first argument 614-1 and second argument 614-2. First argument 614-1 can correspond to the variable created in first code statement 602. Second argument 614-2 can correspond to the variable created in second code statement 604. As such, a code characteristic associated with unidiomatic code part 600 can comprise the assignment of constant values to variables. That is, first constant value 610 and second constant value 612 do not change within unidiomatic code part 600 and thus indicate that first code statement 602 and second code statement 604 are redundant. Fourth code statement 608 can comprise an assertion comprising conditional statement 616 which involves the value determined in third code statement 606.

In the present embodiment, a modification unit, such as modification unit 310 of FIG. 3, can use the inlining modifier to transform the code block comprising first code statement 602, second code statement 604, third code statement 606, and fourth code statement 608 into an idiomatic representation thereof. Specifically, repeated use of the inlining modifier can group first code statement 602, second code statement 604, third code statement 606, and fourth code statement 608 into a single code statement.

FIG. 6B shows first modified code part 618 generated from unidiomatic code part 600 of FIG. 6A.

First modified code part 618 can comprise second code statement 604 and first modified code statement 620. First modified code statement 620 can correspond to an idiomatic representation of first code statement 602 and third code statement 606 of FIG. 6A. First modified code statement 620 can comprise a method call taking first literal argument 622-1 and second non-literal argument 622-2.

A modification unit, such as modification unit 310 of FIG. 3, can use an inlining modifier to generate first modified code statement 620 by utilizing context information extracted from unidiomatic code part 600 of FIG. 6A. Specifically, the inlining modifier can apply a first predefined inlining rule to inline a constant identified within the context information. The first predefined inlining rule can specify that a constant appearing within a first code statement and used within a second code statement is inlined into the second code statement. In the example shown in FIGS. 6A and 6B, first constant value 610 defined in first code statement 602 is used in third code statement 606. The first predefined inlining rule applied to first code statement 602 and third code statement 606 can generate first modified code statement 620 wherein first constant value 610 has been inlined as first literal argument 622-1, replacing first argument 614-1. Second non-literal argument 622-2 can be the same as second argument 614-2.

Whilst first modified code part 618 addresses one of the non-functional issues associated with unidiomatic code part 600 of FIG. 6A, first modified code part 618 can comprise a code characteristic indicative of the need to apply an inlining modifier (e.g., the presence of a redundant code statement). As such, a modification unit, such as modification unit 310 of FIG. 3, can use an inlining modifier to transform first modified code part 618 into an idiomatic representation thereof.

FIG. 6C shows second modified code part 624 generated from first modified code part 618 shown in FIG. 6B.

Second modified code part 624 can comprise second modified code statement 626 and fourth code statement 608 comprising conditional statement 616. Second modified code statement 626 can correspond to an idiomatic representation of second code statement 604 and first modified code statement 620 shown in FIG. 6B. Second modified code statement 626 can comprise a method call taking first literal argument 628-1 and second literal argument 628-2. First literal argument 628-1 in second modified code part 624 can be the same as first literal argument 622-1 in first modified code part 618.

A modification unit, such as modification unit 310 of FIG. 3, can use an inlining modifier to generate second modified code part 624 by utilizing context information extracted from first modified code part 618 of FIG. 6B. Specifically, the inlining modifier can apply the first predefined inlining rule to inline a constant identified within the context information. In the example shown in FIGS. 6B and 6C, the constant value defined in second code statement 604 can be used in first modified code statement 620. The first predefined inlining rule applied to second code statement 604 and first modified code statement 620 can generate second modified code statement 626 wherein the constant value defined in second code statement 604 has been inlined as second literal argument 628-2, replacing second argument 622-2. First literal argument 628-1 in FIG. 6C can be the same as first literal argument 622-1 in FIG. 6B.

Whilst second modified code part 624 addresses one of the non-functional issues associated with first modified code part 618 of FIG. 6B, second modified code part 624 can comprise a code characteristic indicative of the need to apply an inlining modifier. That is, the assignment within second modified code statement 626 can be considered redundant as the value of variable local_3 is not modified before being used within fourth code statement 608. As such, a modification unit, such as modification unit 310 of FIG. 3, can use an inlining modifier to transform second modified code part 624 into an idiomatic representation thereof.

Figure 6D:
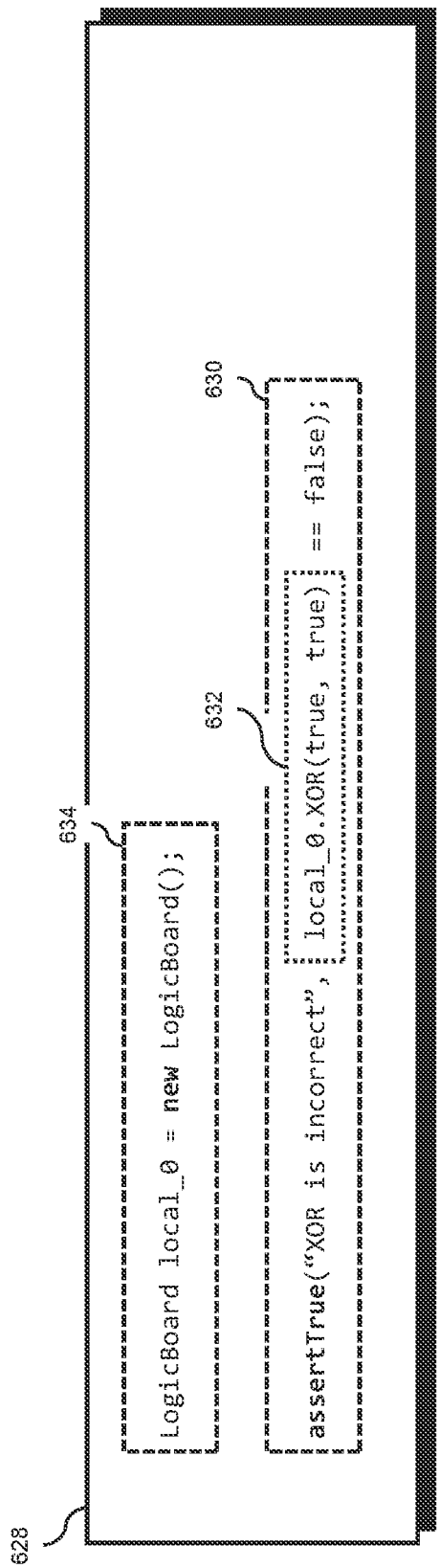
FIG. 6D shows a modified code part generated from the modified code part shown in FIG. 6C according to an embodiment.

FIG. 6D shows third modified code part 628 generated from second modified code part 624 shown in FIG. 6C.

Third modified code part 628 can comprise third modified code statement 630. Third modified code statement 630 can correspond to an idiomatic representation of second modified code statement 626 and fourth code statement 608 shown in FIG. 6C. Third modified code statement 630 can comprise inlined method call 632. FIG. 6D further shows fifth code statement 634.

A modification unit, such as modification unit 310 of FIG. 3, can use an inlining modifier to generate third modified code statement 630 by utilizing context information extracted from second modified code part 624 of FIG. 6C. Specifically, the inlining modifier can apply a second predefined inlining rule to inline a method call identified within the context information. In the example shown in FIG. 6C, the method called in second modified code statement 626 can be assigned to a variable which is used without modification in conditional statement 616 of fourth code statement 608. The second predefined inlining rule can specify that if the return value of a method call appearing in a first code statement is assigned to a variable that is subsequently used in a second code statement, then the method call is inlined into the second code statement. The inlining modifier can apply a line length condition whereby the inlining is only performed if the resulting line length of the modified code statement does not exceed a predefined value. For example, the predefined value for determining maximum line length can be 125 characters. Alternatively, the predefined value for determining maximum line length can be between 80 and 150 characters, more specifically between 80 and 125 characters, and optionally between 80 and 100 characters.

The second predefined inlining rule applied to second modified code statement 626 and fourth code statement 608 can generate third modified code statement 630 wherein method call made in second modified code statement 626 has been inlined as inlined method call 632 within third modified code statement 630.

Whilst third modified code part 628 addresses one of the non-functional issues associated with second modified code part 624 of FIG. 6C, third modified code part 628 can comprise a code characteristic indicative of the need to apply an inlining modifier. That is, creation of object local_0 within fifth code statement 634 can be considered redundant as the object is not modified before being used within third modified code statement 630. As such, a modification unit, such as modification unit 310 of FIG. 3, can use an inlining modifier to transform third modified code part 628 into an idiomatic representation thereof.

Figure 6E:
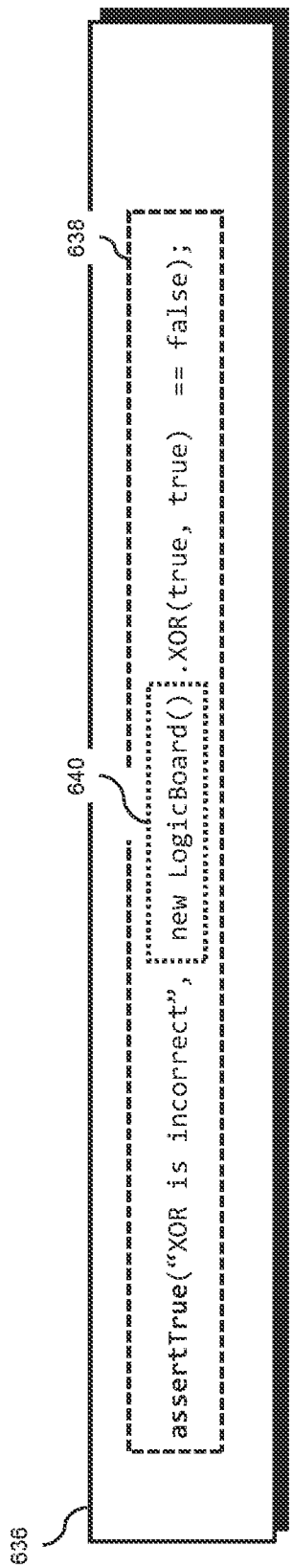
FIG. 6E shows a modified code part generated from the modified code part shown in FIG. 6D according to an embodiment.

FIG. 6E shows fourth modified code part 636 generated from third modified code part 628 shown in FIG. 6D.

Fourth modified code part 636 can comprise fourth modified code statement 638. Fourth modified code statement 638 can comprise inlined object instantiation 640. Fourth modified code statement 638 can comprise an idiomatic representation of fifth code statement 634 shown in FIG. 6D.

A modification unit, such as modification unit 310 of FIG. 3, can use an inlining modifier to generate fourth modified code statement 638 by utilizing context information extracted from third modified code part 628 of FIG. 6D. Specifically, the inlining modifier can apply a third predefined inlining rule to inline an object instantiation identified within the context information. In the example shown in FIG. 6D, the object instantiated in fifth code statement 634 can be used without modification in third modified code statement 630. The third predefined inlining rule can specify that if an object is instantiated in a first code statement and is only ever used in a second code statement, then the object instantiation is inlined into the second code statement. The inlining modifier can apply a line length condition whereby the inlining is only performed if the resulting line length of the modified code statement does not exceed a predefined value. For example, the predefined value for determining maximum line length can be 125 characters. Alternatively, the predefined value for determining maximum line length can be between 80 and 150 characters, more specifically between 80 and 125 characters, and optionally between 80 and 100 characters.

The third predefined inlining rule applied to fifth code statement 634 and third modified code statement 630 and fourth code statement 608 can generate fourth modified code statement 638 wherein the object instantiation made in fifth code statement 634 has been inlined as inlined object instantiation 640 within fourth modified code statement 638.

Fourth modified code part 636 can correspond to an idiomatic representation of unidiomatic code part 600 shown in FIG. 6A. The idiomatic representation can be obtained by chaining an inlining modifier. As such, in one embodiment, a modification unit, such as modification unit 310 of FIG. 3, can be configured to apply an idiomatic modifier to a code part comprising a code characteristic to generate a first modified code part. In this embodiment, the modification unit can be configured to apply the idiomatic modifier to the first modified code part to generate a second modified code part. The process can be repeated until a termination criterion is met. In an embodiment, the termination criterion can be met when the resulting modified code part does not substantially comprise the code characteristic. In alternative embodiment, the termination criterion can be met when the resulting modified code part does not comprise the code characteristic.

In an embodiment, the inlining modifier can use a third predefined inlining rule. The third inlining rule can be applied to a code part comprising a first test method and a second test method. If the first test method comprises a single line (e.g., the arrange and act section have been compressed into the assert section) and the second test method comprises a single line, then the third inlining rule can specify that the two test methods are joined into a single test method. That is, a code statement corresponding to the single line of the second test method can be used to generate a modified code statement within the first test method corresponding to the single line of the second test method.

Figure 6G:
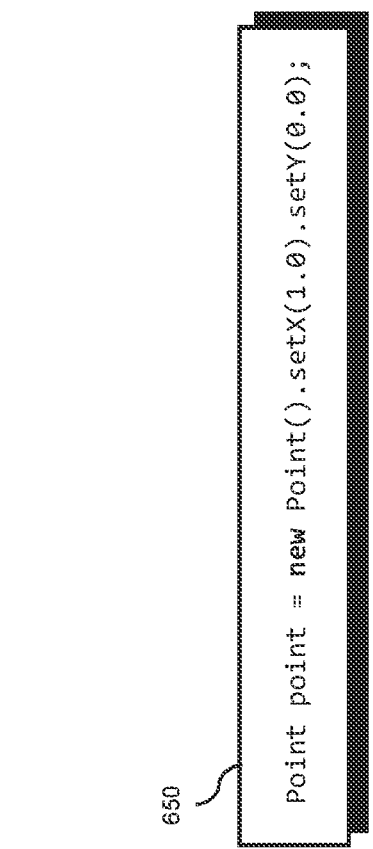
FIG. 6G shows a modified code part generated from the unidiomatic code part shown in FIG. 6F.

In an embodiment, the inlining modifier can use a fourth predefined inlining rule. The fourth predefined inlining rule can correspond to a method chaining rule, as illustrated in FIGS. 6F and 6G.

Figure 6F:
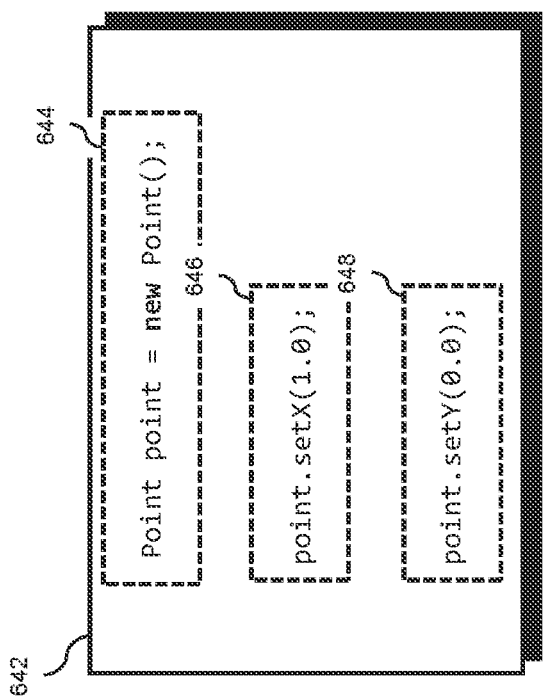
FIG. 6F shows an unidiomatic code part to which a method chaining inlining rule is to be applied.

FIG. 6F shows unidiomatic code part 642 to which a fourth predefined inlining rule is to be applied.

Unidiomatic code part 642 can comprise first code statement 644, second code statement 646, and third code statement 648. First code statement 644 can correspond to the instantiation of an object. Second code statement 646 and third code statement 648 can correspond to calls to setter methods of the object created in first code statement 644.

Second code statement 646 and third code statement 648 can correspond to context information. The fourth predefined inlining rule can utilize the context information to determine that second code statement 646 and third code statement 648 correspond to the sole use of the object created in first code statement 644, and both return the current object (e.g., this). Based on this determination, the fourth predefined learning rule can specify that the object instantiation in first code statement 644, the method call in second code statement 646, and the method call in third code statement 648 can be chained, as shown in FIG. 6G.

FIG. 6G shows idiomatic code part 650 generated from unidiomatic code part 642 of FIG. 6F.

Idiomatic code part 650 can be generated as a result of a modification unit, such as modification unit 310 of FIG. 3, using an inlining modifier comprising the fourth predefined inlining rule. Idiomatic code part 650 can comprise a single code statement which corresponds to a chained representation of first code statement 644, second code statement 646, and third code statement Beneficially, by using an inlining modifier, the modification unit is able to refine a code part over a possible plurality of iterations thereby obtaining a compact representation of a code part which maintains the original functionality whilst using fewer code statements. The resulting idiomatic code part makes more efficient use of memory and storage resources whilst also being easier to understand and more readily matching the code produced by a human software developer.

Import Resolution Modifier

In an embodiment, an idiomatic modifier, such as first idiomatic modifier 314 of FIG. 3, can be an import resolution modifier. The import resolution modifier can disambiguate import clashes from across packages. The import resolution modifier can be obtained from modifier database 320.

The import resolution modifier can resolve issues occurring as a result of two or more classes or static methods with the same name being used within a single code part. For example, a single code part may utilize the ArrayList class from the Java standard library and an ArrayList class from a custom library. The two classes can be naively disambiguated by fully qualifying both classes. For example, disambiguation can be achieved by referring to "java.util.ArrayList" and "com.diffblue.custom.ArrayList". The import resolution modifier can improve readability and avoid clashes by utilizing context information to determine which class or static method is to be imported and which class or static method is to be fully qualified.

FIG. 7A shows code part 700 to which an import resolution modifier is to be applied.

Code part 700 can correspond to a representation of a code section. Specifically, code part 700 can correspond to an abstract syntax tree representing a test. Code part 700 can comprise first code statement 702, second code statement 704, and third code statement 706. First code statement 702 can comprise an exponential method, represented by first node 708, from the standard Java math library. Second code statement 704 can comprise an exponential method, represented by second node 710, from a custom library. Third code statement 706 can comprise an assertion which determines whether the two exponential methods return the same result.

The method represented by first node 708 can have the same name as the method represented by second node 710. As such, the method names can clash and may need disambiguation. The code characteristic associated with code part 700 is therefore the presence of a clash requiring disambiguation. Such a clash could occur as a result of attempting to import and use a class with the same name as an existing class within the code. Such a clash could also occur as a result of attempting to import and use a static method with the same name as an existing method within the code.

In the present embodiment, a modification unit, such as modification unit 310 of FIG. 3, can use the import resolution modifier to transform either first code statement 702 or second code statement 704 into an idiomatic representation thereof. Specifically, the import resolution modifier can apply a heuristic to determine a priority value for the method associated with first node 708 and a priority value for the method associated with second node 710 based on the identified context information. In the example show in FIG. 7A, the context information can comprise the method associated with first node 708 and the method associated with second node 710. The code statement comprising the method having the lowest priority value can then be transformed into a modified code statement wherein the method is fully qualified.

FIG. 7B shows modified code part 712 generated from code part 700 of FIG. 7A.

Modified code part 712 can comprise first code statement 714, modified second code statement 716, and third code statement 718. Optionally, modified code part 712 can comprise import statement 720. First code statement 714 can correspond to first code statement 702 shown in FIG. 7A. Modified second code statement 716 can correspond to an idiomatic representation of second code statement 704 shown in FIG. 7A determined as a result of applying an import resolution modifier to code part 700 of FIG. 7A. Third code statement 718 can correspond to third code statement 706 shown in FIG. 7A.

A modification unit, such as modification unit 310 of FIG. 3, can use an import resolution modifier to generate modified second code statement 716. The import resolution modifier can determine a first priority value for the first method associated with first node 708 of FIG. 7A and a second priority value for the second method associated with second node 710. The priority values can be determined using the context information and a heuristic. The heuristic can specify that a class or method from a core library is assigned a higher priority value than a class or method from a custom library or package. The import resolution modifier can fully qualify the class or method with the lowest priority. If both classes, or methods, have the same priority, then one of the classes or methods are chosen at random to be fully qualified. Because the method associated with second node 710 within second code statement 704 in FIG. 7A is from a custom library, the import resolution modifier can transform second code statement 704 to generate modified second code statement 716 by fully qualifying the method call within modified second code statement 716. Optionally, the import resolution modifier can further generate import statement 720 which imports the static method associated with first node 708 of FIG. 7A.

Formatting Modifier

In an embodiment an idiomatic modifier, such as first idiomatic modifier 314 of FIG. 3, can be a formatting modifier. The formatting modifier can transforms a code statement comprising a formatting issue into an idiomatic representation thereof. For example, the formatting modifier can be obtained from modifier database 320.

A formatting issue associated with a code part can include incorrect indentation, incorrect line breaking, incorrect use of whitespace, and the like. In embodiments where the code part is an intermediate or abstract representation of a code section, then the formatting issue may not be present in the code section, but the resolution of the issue (e.g., correct indentation, correct use of line breaks, etc.) can nevertheless be enforced in the modified code part by the formatting modifier.

Figure 8A:
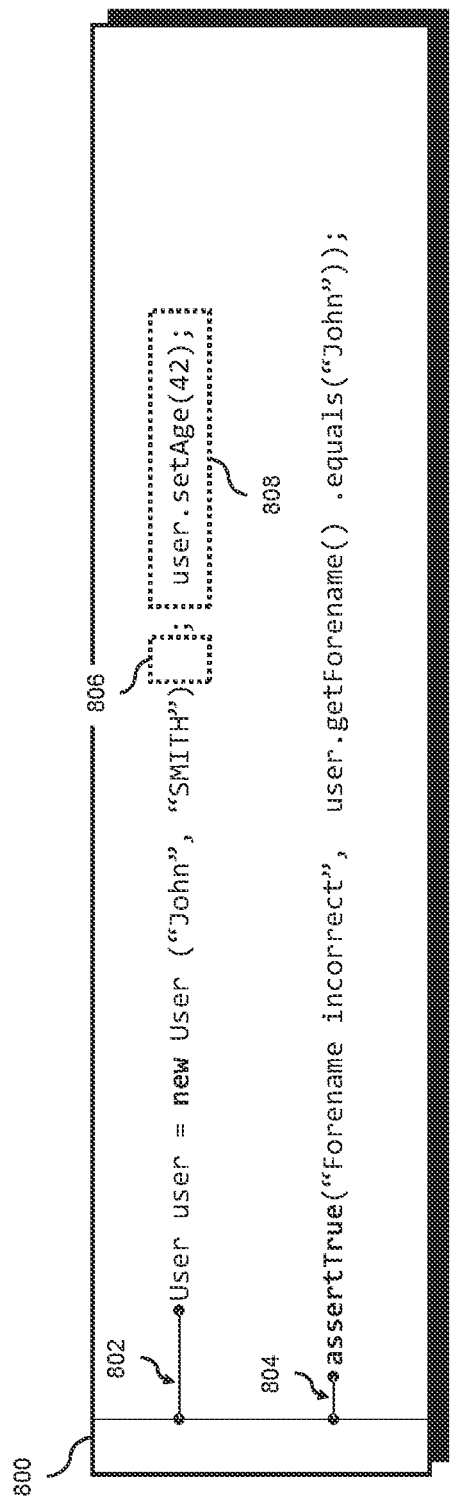
FIG. 8A shows an unidiomatic code part to which a formatting modifier is to be applied according to an embodiment.

FIG. 8A shows unidiomatic code part 800 to which a formatting modifier is to be applied.

Unidiomatic code part 800 can comprise first indentation 802 and second indentation 804 different to first indentation 802. Unidiomatic code part can further comprise whitespace 806 and code statement 808. Code statement 808 can occur on the same line as another code statement within unidiomatic code part 800. As such, a code characteristic associated with a code part for which a formatting modifier is to be applied can comprise the presence of unequal indentations, unnecessary whitespace, and/or multiple code statements appearing within the same line. First indentation 802, second indentation 804, whitespace 806, and code statement 808 can correspond to context information. The context information shown in this instance represents a subset of the context information of code part 400 extracted by an analysis unit, such as analysis unit 308 of FIG. 3.

A modification unit, such as modification unit 310 of FIG. 3, can use the formatting modifier to transform unidiomatic code part 800 into an idiomatic representation thereof. Particularly, the formatting modifier can transform an unidiomatic code statement according to a formatting rule. The formatting modifier can be repeatedly applied to unidiomatic code part 800 to address each of the formatting issues present within unidiomatic code part 800.

Figure 8B:
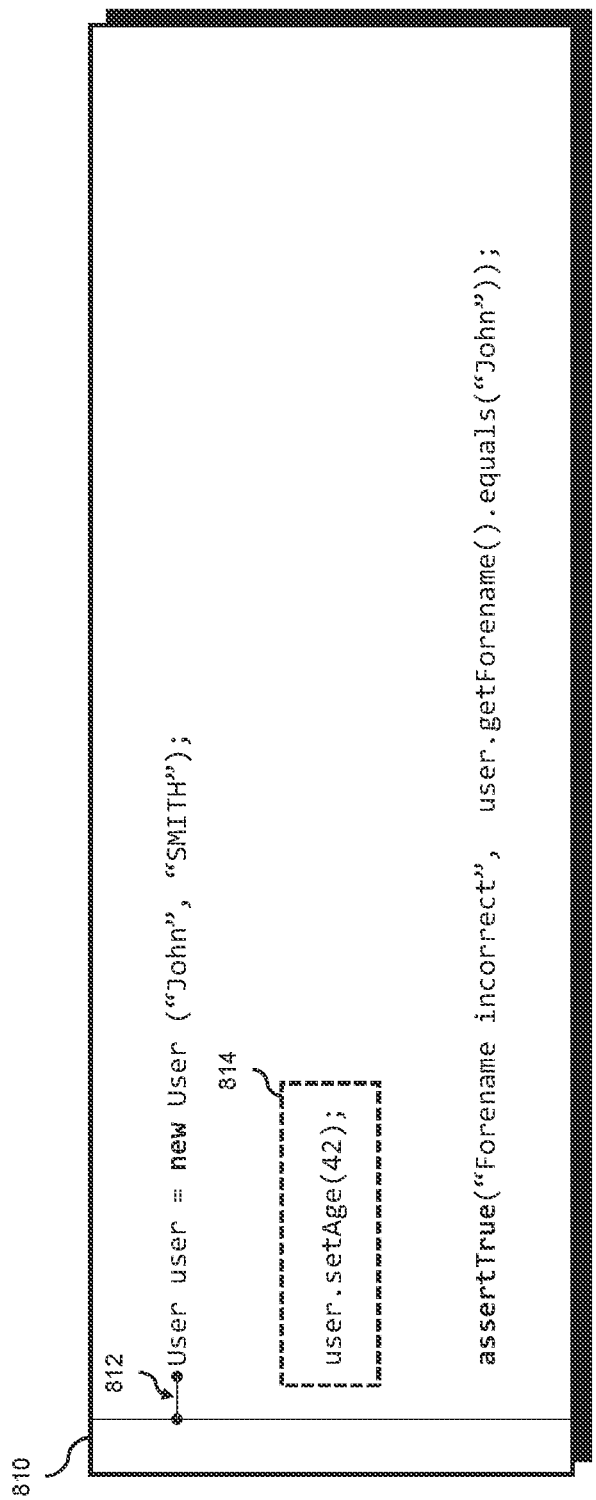
FIG. 8B shows a modified code part generated from the unidiomatic code part shown in FIG. 8A.

FIG. 8B shows modified code part 810 generated from unidiomatic code part 800 of FIG. 8A.

Modified code part 810 can comprise transformed first indentation 812 and transformed code statement 814. Transformed first indentation 812 can correspond to a transformation of first indentation 802 shown in FIG. 8A. Transformed code statement 814 can correspond to a transformation of code statement 808 shown in FIG. 8A.

A modification unit, such as modification unit 310 of FIG. 3, can use a formatting modifier to transform first indentation 802 into transformed first indentation 812 according to a first formatting rule. The first formatting rule can determine transformed first indentation 812 based on the context information. Specifically, first indentation 802 can be transformed to match second indentation 804 as indicated in the context information. Alternatively, both first indentation 802 and second indentation 804 could be transformed to a predefined indentation value such as a single tab stop or four spaces.

A modification unit, such as modification unit 310 of FIG. 3, can use a formatting modifier to transform the code statement comprising whitespace 806 according to a second formatting rule. The second formatting rule can determine the transformed code statement based on the context information. Specifically, any code statements identified from the context information as comprising white space can be transformed into an idiomatic representation where the transformed code statement has been stripped of the white space (as shown by the first code statement in modified code part 810 of FIG. 8B).

A modification unit, such as modification unit 310 of FIG. 3, can use a formatting modifier to transform code statement 808 according to a third formatting rule. The third formatting rule can determine transformed code statement 814 based on the context information. Specifically, the context information can indicate that code statement 808 is on the same line as another code statement. The third formatting rule can specify that code statement 808 is to be transformed by placing transformed code statement 814 on a separate line within modified code part 810.

Whilst the above example describes three formatting rules, the skilled person will appreciate that the present disclosure is not intended to be limited as such. Indeed, the set of formatting rules available to a formatting modifier can further include: transforming code statements exceeding a predefined character length into a representation spanning multiple lines; transforming bracket placements; and/or transforming multiple single-line comments in a contiguous block into a single multi-line comment. In one embodiment, a formatting modifier can enforce a set of predefined coding standards such that the modified code part conforms to the predefined coding standards.

In a further embodiment, a formatting modifier can comprise a semantic formatting rule. The semantic formatting rule can identify a code block from the context information, wherein the code block comprises a plurality of code statements relating to a plurality of objects. For example, the code block can comprise a first code statement relating the instantiation of a first object, a second code statement relating to calling a setter method of the first object, a third code statement relating to the instantiation of a second object, and a fourth code statement relating to calling a setter method of the second object. The plurality of code statements can be contiguous in that each subsequent code statement immediately proceeds the previous code statement (e.g., on the next line). The semantic formatting rule can identify a plurality of sub code blocks from the plurality of code blocks, where the code statements within each sub code block are semantically related. The semantic formatting rule can modify the code part by distinguishing each of the plurality of sub blocks. The plurality of code parts can be distinguished by inserting a blank line between consecutive sub blocks. In the previous example, the semantic formatting rule can use the context information to identify a first sub code block comprising the first code statement and the second code statement, which are semantically linked by the first object, and a second sub code block comprising the third code statement and the fourth code statement, which are semantically linked by the second object. In this example, the semantic formatting rule can modify the code part comprising the code block by inserting a blank line between the second code statement and the third code statement, thus semantically grouping the code statements. This results in a more idiomatic representation of the code part.

Other Modifiers

In an embodiment, an idiomatic modifier, such as first idiomatic modifier 314 of FIG. 3, can be a redundancy modifier. The redundancy modifier can identify and remove redundant code statements from a code part. The redundancy modifier can be obtained from modifier database 320.

In the present embodiment, a code characteristic associated with a code part to which a redundancy modifier is to be applied can comprise an indication of the presence of one or more redundant code statements within the code part. When the code part corresponds to a test, context information can include the coverage achieved within the method under test when each code statement has been removed. If removal of a code statement results in the code no longer compiling, then the code statement is not redundant. If removal of a code statement results in a different level of coverage being achieved, then the code statement is not redundant. If removal of a code statement results in the same coverage being achieved, then the code statement is redundant and the redundancy modifier can remove the code statement from the code part.

In an embodiment, an idiomatic modifier, such as first idiomatic modifier 314 of FIG. 3, can be a cast modifier. The cast modifier can identify and remove an unnecessary cast from a code statement. The cast modifier can be obtained from modifier database 320.

In the present embodiment, a code characteristic associated with a code part to which a cast modifier is to be applied can comprise the use of a cast within a code statement. A cast modifier can utilize context information to identify whether or not a cast appearing within a code statement is necessary.

If the cast is deemed unnecessary, then the cast modifier can transform the code statement into an idiomatic representation by removing the cast and/or changing the type of the variable. For example, a variable of type Object to which a value is assignment via a cast to a String can be transformed by the cast modifier to a variable of type String without the cast.

In an embodiment, an idiomatic modifier, such as first idiomatic modifier 314 of FIG. 3, can be a generic type modifier. The generic type modifier can remove generic types from a code statement when the generic type is not needed. The cast modifier can be obtained from modifier database 320.

In the present embodiment, a code characteristic associated with a code part to which a generic type modifier is to be applied can comprise the presence of a generic type within a code statement. A generic type modifier can utilize context information to identify whether or not the generic type is needed. If the generic type is not needed, then the generic type modifier can transform the code statement into an idiomatic representation by removing the unneeded generic type. For example, if the context information indicates that the generic type parameter appears on the right hand side of an expression within a code statement, then the transformed code statement can omit the generic type parameter on the right hand side of the expression.

Chaining Modifiers

Whilst the above idiomatic modifiers have been described in relation to the application of a single modifier to a code part, the skilled person will appreciate that the systems and methods of the present disclosure allow idiomatic modifiers to be chained in order to generate an idiomatic representation of a code part.

The example idiomatic code part shown in FIG. 2B is generated as a result of a chain of idiomatic modifiers being applied. That is, a method naming modifier is applied to transform method name 202 of FIG. 2A into idiomatic method name 224. The modified code part produced as a result of executing the method naming modifier can then be used as input to an inlining modifier which inlines first variable name 206 and second variable name 208 of FIG. 2A as first parameter value 228-1 and second parameter value 228-2. The modified code part produced as a result of executing the inlining modifier can be used as input to a variable naming modifier to generate first idiomatic variable name 226, and the resulting modified code part can then be used as input to a formatting modifier to produce first adjusted indentation 230 and second adjusted indentation 232.

As such, the systems and methods of the present disclosure allow for complex idiomatic modifiers to be constructed by combining a plurality of simple idiomatic modifiers. By using the output of one modification process as the input to a subsequent modification process (using either the same idiomatic modifier or a different idiomatic modifier) allows complex idiomatic source code to be automatically generated using a chain of simple modifiers. The idiomatic source code generated using the systems and method of the present disclosure has the appearance of human authorship and thus improves the usability and readability of the code. Furthermore, the idiomatic source code can be generated in a resource efficient way.

Figure 9:
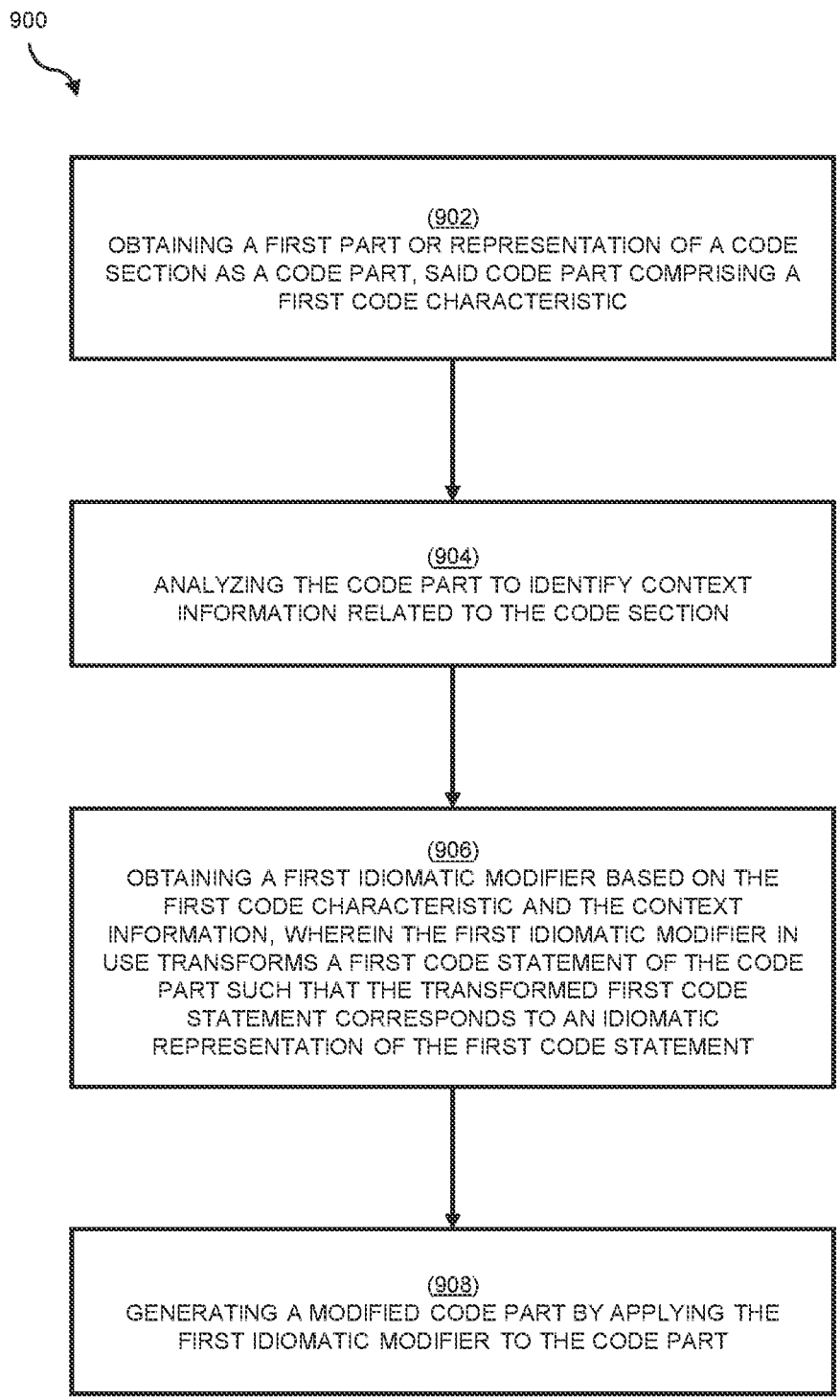
FIG. 9 shows a method for idiomatic source code generation according to an aspect of the present disclosure.

FIG. 9 shows method 900 for idiomatic source code generation according to an aspect of the present disclosure.

Method 900 comprises steps 902, 904, 906, 908.

Step 902 comprises obtaining a first part or representation of a code section as a code part, said code part comprising a first code characteristic.

For instance, the first characteristic can correspond to a non-functional issue associated with one or more code statements included in the code part.

Step 904 comprises analyzing the code part to identify context information related to the code section.

For instance, the context information can relate to one or more non-functional features of the code part. In an embodiment, the one or more non-functional features of the code part can include one or more chosen from the group including: class names, field names, method names, variable names, construction and formatting of literals, construction and formatting of container types, framework and version-specific assertions, framework and version-specific class annotations, framework and version-specific method annotations, omission of casts where possible, omission of type parameters where possible, inlining of statements and call chaining where appropriate, factoring out of common code where appropriate, imports, static imports where appropriate, placement of comments, visual code structuring where appropriate, and/or code formatting such indentations and line breaking.

Step 906 comprises obtaining a first idiomatic modifier based on the first code characteristic and the context information, wherein the first idiomatic modifier in use transforms a first code statement of the code part such that the transformed first code statement corresponds to an idiomatic representation of the first code statement.

In an embodiment, the first idiomatic modifier can transform the first code statement by modifying a portion of the first code statement to create a modified portion of the first code statement. For example, the transformed first code statement can comprises the modified portion of the first code statement.

In an embodiment, the first idiomatic modifier in use transforms a second code statement of the code part such that the transformed first code statement corresponds to an idiomatic representation of the first code statement and the second code statement.

Step 908 comprises generating a modified code part by applying the first idiomatic modifier to the code part.

Figure 10:
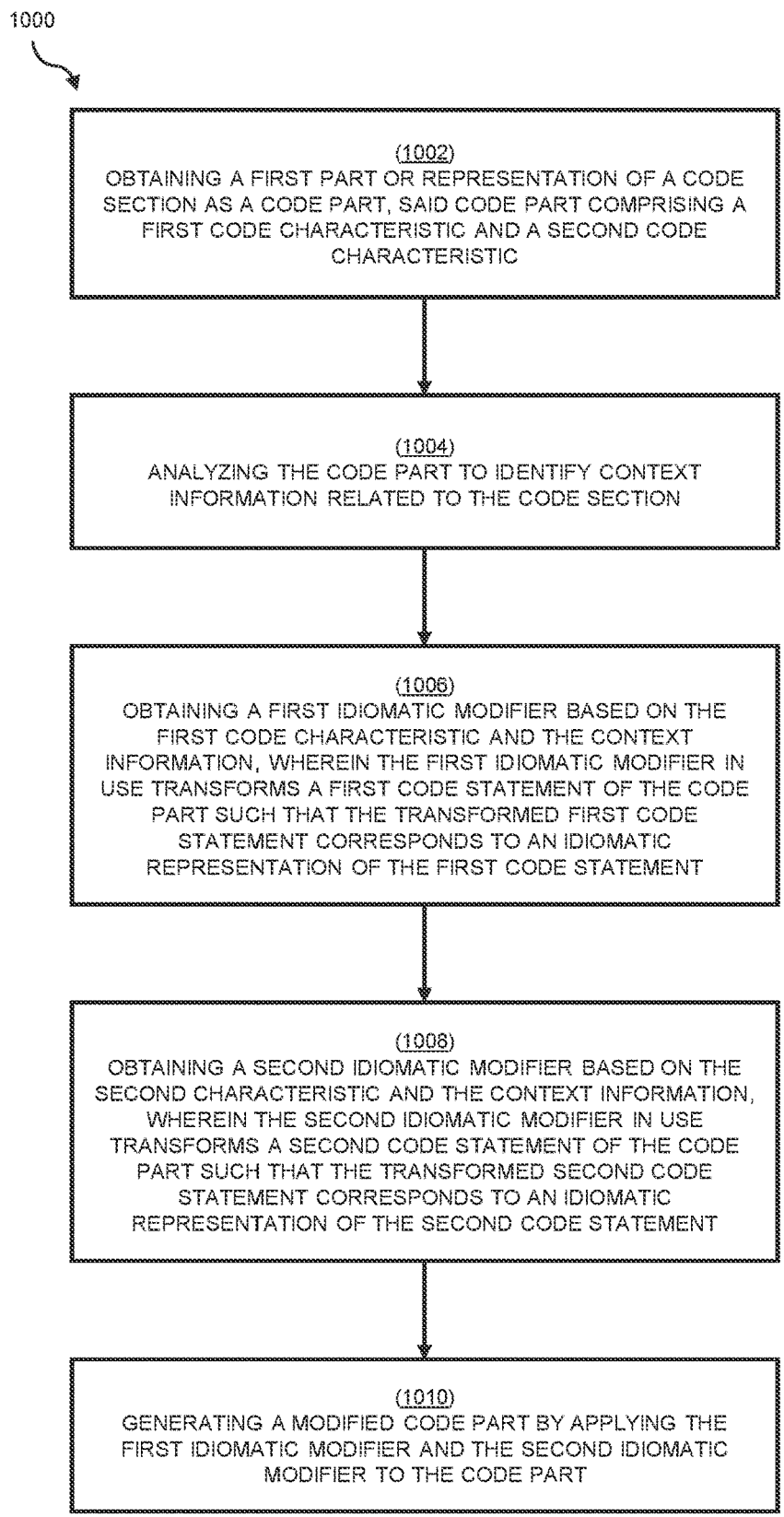
FIG. 10 shows a method for idiomatic source code generation according to an embodiment.

FIG. 10 shows method 1000 for idiomatic source code generation according to an embodiment of the present disclosure.

Method 1000 comprises steps 1002, 1004, 1006, 1008, 1010.

Step 1002 comprises obtaining a first part or representation of a code section as a code part, said code part comprising a first code characteristic and a second code characteristic.

For instance, the first code characteristic and the second code characteristic can correspond to a non-functional issue associated with one or more code statements included in the code part.

Step 1004 corresponds to step 904 of method 900 shown in FIG. 9.

Step 1006 corresponds to step 906 of method 900 shown in FIG. 9.

Step 1008 comprises obtaining a second idiomatic modifier based on the second characteristic and the context information, wherein the second idiomatic modifier in use transforms a second code statement of the code part such that the transformed second code statement corresponds to an idiomatic representation of the second code statement.

In an embodiment, the second code statement can be the first code statement.

Step 1010 comprises generating a modified code part by applying the first idiomatic modifier and the second idiomatic modifier to the code part.

In an embodiment, the second idiomatic modifier can be applied after the first idiomatic modifier such that the second idiomatic modifier modifies the modified code part generated by the first idiomatic modifier. In an alternative embodiment, the first idiomatic modifier can be applied after the second idiomatic modifier such that the first idiomatic modifier modifies the modified code part generated by the second idiomatic modifier. In a further embodiment, both the first idiomatic modifier and the second idiomatic modifier are applied to the code part and the resulting modified code parts are merged to generate the modified code part.

The invention claimed is:

1. A computer-implemented method comprising:
obtaining a first part or representation of a code section as a code part, said code part comprising a first code characteristic and a second code characteristic;
analyzing the code part to identify context information related to the code section;
obtaining a first idiomatic modifier based on the first code characteristic and the context information, wherein the first idiomatic modifier in use transforms a first code statement of the code part such that the transformed first code statement corresponds to an idiomatic representation of the first code statement;
obtaining a second idiomatic modifier based on the second characteristic and the context information, wherein the second idiomatic modifier in use transforms a second code statement of the code part such that the transformed second code statement corresponds to an idiomatic representation of the second code statement;
generating a modified code part by applying the first and second idiomatic modifiers to the code part, wherein the modified code part corresponds to an idiomatic representation of the code part; and
compiling the modified code part.

2. The computer-implemented method of claim 1, wherein the first idiomatic modifier transforms the first code statement by modifying a portion of the first code statement to create a modified portion of the first code statement.

3. The computer-implemented method of claim 2, wherein the transformed first code statement comprises the modified portion of the first code statement.

4. The computer-implemented method of claim 1, wherein the first idiomatic modifier in use transforms a second code statement of the code part such that the transformed first code statement corresponds to an idiomatic representation of the first code statement and the second code statement.

5. The computer-implemented method of claim 1, wherein the second code statement is the first code statement.

6. The computer-implemented method of claim 1, wherein the first code characteristic corresponds to a non-functional issue associated with one or more code statements included in the code part.

7. The computer-implemented method of claim 1, wherein the context information relates to one or more non-functional features of the code part.

8. The computer-implemented method of claim 7, wherein the one or more non-functional features of the code part include one or more chosen from the group including: class names, field names, method names, variable names, construction and formatting of literals, construction and formatting of container types, framework and version-specific assertions, framework and version-specific class annotations, framework and version-specific method annotations, omission of casts where possible, omission of type parameters where possible, inlining of statements and call chaining where appropriate, factoring out of common code where appropriate, imports, static imports where appropriate, placement of comments, visual code structuring where appropriate, or code formatting such indentations and line breaking.

9. A system comprising:
one or more processors; and
one or more non-transitory computer-readable media that collectively store instructions that, when executed by the one or more processors, cause the system to perform operations, the operations comprising:
obtaining a first part or representation of a code section as a code part, said code part comprising a first code characteristic and a second code characteristic;
analyzing the code part to identify context information related to the code section;
obtaining a first idiomatic modifier based on the first code characteristic and the context information, wherein the first idiomatic modifier in use transforms a first code statement of the code part such that the transformed first code statement corresponds to an idiomatic representation of the first code statement;
obtaining a second idiomatic modifier based on the second characteristic and the context information, wherein the second idiomatic modifier in use transforms a second code statement of the code part such that the transformed second code statement corresponds to an idiomatic representation of the second code statement;
generating a modified code part by applying the first and second idiomatic modifiers to the code part, wherein the modified code part corresponds to an idiomatic representation of the code part; and
compiling the modified code part.

10. The system of claim 9, wherein the first idiomatic modifier transforms the first code statement by modifying a portion of the first code statement to create the transformed first code statement.

11. The system of claim 9, wherein the transformed first code statement is different to the first code statement.

12. The system of claim 9, wherein the first idiomatic modifier in use transforms a second code statement of the code part such that the transformed first code statement corresponds to an idiomatic representation of the first code statement and the second code statement.

13. The system of claim 9, wherein the second code statement is the first code statement.

14. The system of claim 9, wherein the first characteristic corresponds to a non-functional issue associated with one or more code statements included in the code part.

15. A non-transitory computer readable medium comprising one or more instructions which when executed by one or more processors cause a device to carry out operations as set forth in the method of claim 1.

16. The computer-implemented method of claim 1, wherein the idiomatic representation of the code part has characteristics indicative of code written by a human software developer.

17. The computer-implemented method of claim 16, wherein the code part is source code.

\* \* \* \* \*